(12) United States Patent
Cai et al.

(10) Patent No.: US 11,077,406 B2
(45) Date of Patent: Aug. 3, 2021

(54) CENTRAL TUBE SET, SPIRAL WOUND REVERSE OSMOSIS MEMBRANE COMPONENT, AND REVERSE OSMOSIS WATER PURIFIER

(71) Applicant: FOSHAN SHUNDE MIDEA WATER DISPENSER MFG. CO., LTD., Foshan (CN)

(72) Inventors: Xuegang Cai, Foshan (CN); Peng Gui, Foshan (CN); Fangzhen Zheng, Foshan (CN); Guodong Song, Foshan (CN)

(*) Notice: Subject to any disclaimer, the term of this patent is extended or adjusted under 35 U.S.C. 154(b) by 410 days.

(21) Appl. No.: 16/286,540

(22) Filed: Feb. 26, 2019

(65) Prior Publication Data

US 2019/0193031 A1      Jun. 27, 2019

Related U.S. Application Data

(63) Continuation of application No. PCT/CN2016/113094, filed on Dec. 29, 2016, and a
(Continued)

(30) Foreign Application Priority Data

Aug. 26, 2016   (CN) .......................... 201610737509.3
Aug. 26, 2016   (CN) .......................... 201610739974.0
Aug. 26, 2016   (CN) .......................... 201610743900.4

(51) Int. Cl.
*B01D 63/10*      (2006.01)
*B01D 61/08*      (2006.01)
(Continued)

(52) U.S. Cl.
CPC ............. *B01D 63/10* (2013.01); *B01D 61/08* (2013.01); *C02F 1/441* (2013.01); *B01D 61/025* (2013.01);
(Continued)

(58) Field of Classification Search
CPC ............ B01D 2313/08; B01D 2313/12; B01D 61/025; B01D 61/08; B01D 61/10; B01D 63/10; B01D 63/106; C02F 1/441
See application file for complete search history.

(56) References Cited

U.S. PATENT DOCUMENTS 8,021,550 B2    9/2011   Beauchamp et al.
8,696,904 B2    4/2014   Thiyagarajan et al.
(Continued)

FOREIGN PATENT DOCUMENTS

AU        2009303738 A1    4/2010
CN        201578990 U       9/2010
(Continued)

*Primary Examiner* — Dirk R Bass
(74) *Attorney, Agent, or Firm* — Kilpatrick Townsend & Stockton, LLP

(57) ABSTRACT

Disclosed is a central tube set. The central tube set includes: a permeate tube, a peripheral wall of the permeate tube being arranged with a pure water influx hole communicating with an internal channel of the permeate tube; and a plurality of wastewater tubes arranged at intervals. The wastewater tubes are arranged around the permeate tube, a peripheral wall of each wastewater tube is arranged with a wastewater influx hole communicating with an internal channel of each wastewater tube. The plurality of the wastewater tubes and the permeate tube are arranged at intervals, to form a receiving space between each wastewater tube and the permeate tube, for receiving a portion of the reverse osmosis membrane sheet set which is extending into the central tube set. The present application further provides a spiral wound reverse osmosis membrane component and a reverse osmosis water purifier.

18 Claims, 21 Drawing Sheets

Related U.S. Application Data continuation of application No. PCT/CN2016/113101, filed on Dec. 29, 2016, and a continuation of application No. PCT/CN2016/113080, filed on Dec. 29, 2016.

(51) Int. Cl.
*B01D 61/02* (2006.01)
*C02F 1/44* (2006.01)
*B01D 61/10* (2006.01)

(52) U.S. Cl.
CPC ............ *B01D 61/10* (2013.01); *B01D 63/106* (2013.01); *B01D 2313/08* (2013.01); *B01D 2313/12* (2013.01)

(56) References Cited

U.S. PATENT DOCUMENTS

| | | |
|---|---|---|
| 8,961,790 B2 | 2/2015 | Beauchamp et al. |
| 8,968,566 B2 | 3/2015 | Beauchamp et al. |
| 2010/0096308 A1 | 4/2010 | Beauchamp et al. |
| 2010/0096309 A1 | 4/2010 | Beauchamp et al. |
| 2010/0096319 A1 | 4/2010 | Beauchamp et al. |
| 2011/0233128 A1 | 9/2011 | Beauchamp et al. |
| 2011/0240546 A1 | 10/2011 | Beauchamp et al. |
| 2012/0103891 A1 | 5/2012 | Thiyagarajan et al. |
| 2012/0160758 A1 | 6/2012 | Beauchamp et al. |

FOREIGN PATENT DOCUMENTS

| | | |
|---|---|---|
| CN | 202666515 U | 1/2013 |
| CN | 103180033 A | 6/2013 |
| CN | 102186567 B | 8/2016 |
| CN | 106110894 A | 11/2016 |
| CN | 106139910 A | 11/2016 |
| CN | 206045809 U | 3/2017 |
| CN | 206045810 U | 3/2017 |
| CN | 206103724 U | 4/2017 |
| RU | 2304018 C2 | 8/2007 |

CENTRAL TUBE SET, SPIRAL WOUND REVERSE OSMOSIS MEMBRANE COMPONENT, AND REVERSE OSMOSIS WATER PURIFIER

CROSS-REFERENCE

This application is a continuation in part application, which claims priority of PCT Application No. PCT/CN2016/113094, filed with the Chinese Patent Office on 12/29/2016 and entitled "Spiral wound reverse osmosis membrane element, membrane wound method thereof and reverse osmosis water purifier", PCT Application No. PCT/CN2016/113101, filed with the Chinese Patent Office on Dec. 29, 2016 and entitled "Spiral wound reverse osmosis membrane element, filter element and reverse osmosis water purifier", and PCT Application No. PCT/CN2016/113080, filed with the Chinese Patent Office on 12/29/2016 and entitled "Center tube group and spiral wound reverse osmosis membrane element", which is incorporated herein by reference in its entirety.

FIELD

The application relates to the field of reverse osmosis water purification, in particular to a central tube set, a spiral wound reverse osmosis membrane component using the central tube set, a filter cartridge using the spiral wound reverse osmosis membrane component, a reverse osmosis water purifier, and a winding method of the spiral wound reverse osmosis membrane component.

BACKGROUND

Spiral wound reverse osmosis membrane component, also named as wound reverse osmosis membrane component, is a common used component in water treatment technology. It generally has a cylindrical pressure vessel as a housing, inside which there is a central tube defined with a plurality of holes. The spiral wound reverse osmosis membrane component further includes a multilayer wound around the central tube, the multilayer is formed by alternatively laminating of reverse osmosis membranes and guiding nets. The center tube is connected with both ends of the housing through connectors. During in use, feed water enters the housing from one end, a portion of the feed water forms permeate having a lower concentration by the reverse osmosis membrane under pressure, and enters the central tube and flows out from one end or both ends of the central tube, and this portion of water can be called produced water or pure water; the other portion flows out from the other end of the housing and can be called wastewater or concentrate.

By the spiral-wound reverse osmosis membrane component in the prior art, after feed water is treated, a large portion of the feed water is discharged as wastewater, and only a small portion of the feed water forms pure water. Especially for the spiral-wound reverse osmosis membrane component with a large flux, the proportion of pure water is comparatively even small, and the recovery ratio of the feed water is low, so the feed water is wasted.

SUMMARY

The main purpose of the present application is to provide a central tube set, aiming at improving the recovery rate of feed water and at realizing high water recovery.

In order to achieve the aforementioned purpose, the central tube set provided in the present application includes a permeate tube, in which a peripheral wall of the permeate tube being defined with a pure water influx hole communicating with an internal channel of the permeate tube;

a plurality of wastewater tubes defined at intervals, the wastewater tubes being defined around the permeate tube, a peripheral wall of each wastewater tube being defined with a wastewater influx hole communicating with an internal channel of each wastewater tube;

the plurality of the wastewater tubes and the permeate tube are defined at intervals, to form a receiving space between each wastewater tube and the permeate tube, for receiving a portion of the reverse osmosis membrane sheet set which is extending into the central tube set.

In one embodiment, a quantity of wastewater tubes is N, and N is greater than or equal to 3; a cross section of the permeate tube is defined N-polygonal and correspondingly has N lateral surfaces, and each lateral surface is defined with the pure water influx hole; each wastewater tube is defined at a position associated with one of the lateral surfaces; or a quantity of wastewater tubes is two; the permeate tube is a flat tube, and the permeate tube has two lateral surfaces, and each of the lateral surfaces are defined with the pure water influx hole; each of the wastewater tubes are defined at a position associated with one of the lateral surfaces.

In one embodiment, a plurality of pure water influx holes are defined on each lateral surface at intervals, and the plurality of pure water influx holes are defined along a length direction of the permeate tube; and/or, each wastewater tube is defined with a plurality of wastewater influx holes at intervals, and the plurality of wastewater influx holes are defined along a length direction of each of the wastewater tube.

In one embodiment, a cross section of the permeate tube is circular, a peripheral wall of the permeate tube is divided into a plurality of arc surface sections associating with the plurality of wastewater tubes along a peripheral direction of the permeate tube, and each arc surface section is defined with the pure water influx hole; each wastewater tube is defined at a position corresponding to one of the arc surface sections.

In one embodiment, a plurality of pure water influx holes are defined at intervals on each arc surface section, and the plurality of pure water influx holes are defined along a length direction of the permeate tube; and/or, each wastewater tube is defined with a plurality of wastewater influx holes at intervals, and a plurality of wastewater influx holes are defined along a length direction of the wastewater tube.

In one embodiment, the peripheral wall of the permeate tube is defined with a first avoiding opening extending along the length direction of the permeate tube.

In one embodiment, a first strengthening rib is defined in the first avoiding opening, and two ends of the first strengthening rib are respectively connected with different two edges of the first avoiding opening.

In one embodiment, the peripheral wall of the wastewater tube is defined with a second avoiding opening extending along the length direction of the wastewater tube.

In one embodiment, a second strengthening rib is defined in the second avoiding opening, and two ends of the second strengthening rib are respectively connected with different two edges of the second avoiding opening.

In one embodiment, one end of the permeate tube is plugged, to allow permeate to flow to the other end of the permeate tube; and/or, one end of at least one of the wastewater tubes is plugged, to allow wastewater to flow to the other end of the wastewater tube.

In one embodiment, one end of the permeate tube is plugged and one end of each wastewater tube is plugged; the plugged end of the permeate tube and the plugged end of the wastewater tube are located on a same side.

The application also provides a spiral wound reverse osmosis membrane component, which includes a central tube set and a plurality of reverse osmosis membrane sheet sets. Each reverse osmosis membrane sheet set has a first portion positioned inside the central tube set and a second portion positioned outside the central tube set.

In which, the central tube set includes:

a permeate tube, a peripheral wall of the permeate tube being defined with a pure water influx hole communicating with an internal channel of the permeate tube; and a plurality of wastewater tubes defined at intervals, the wastewater tubes being defined around the permeate tube, a peripheral wall of each wastewater tube being defined with a wastewater influx hole communicating with an internal channel of each wastewater tube;

the plurality of the wastewater tubes and the permeate tube are defined at intervals, to form a receiving space between each wastewater tube and the permeate tube, for receiving a portion of the reverse osmosis membrane sheet set which is extending into the central tube set. Each wastewater tube and the permeate tube are separated by the first portion of one of the reverse osmosis membrane sheet sets. The second portion of the plurality of the reverse osmosis membrane sheet set forms a plural membrane assembly surrounding the central tube set.

In one embodiment, each reverse osmosis membrane sheet set includes a reverse osmosis membrane sheet, an influx guiding net and a pure water guiding net, in which the influx guiding net and the pure water guiding net are respectively defined on front and back surfaces of the reverse osmosis membrane sheet.

In which, the influx guiding net of each reverse osmosis membrane sheet set does not contact with the permeate tube and the back surface of reverse osmosis membrane sheet of the other reverse osmosis membrane sheet sets.

The pure water guiding net of each reverse osmosis membrane sheet set does not contact with the wastewater tube and the front surface of reverse osmosis membrane sheet of the other reverse osmosis membrane sheet sets.

In one embodiment, the spiral wound reverse osmosis membrane component further comprises a first end cover and a second end cover, in which the first end cover and the second end cover are respectively sleeved at two ends of the central tube set and the plurality of reverse osmosis membrane sheet sets, to position the central tube set and the reverse osmosis membrane sheet set;

In which, the first end cover is defined with a wastewater outlet and a pure water outlet; or, the first end cover is defined with a wastewater outlet, and the second end cover is defined with a pure water outlet; the wastewater tube is connected with the wastewater outlet and the permeate tube is connected with the pure water outlet.

In one embodiment, an inner side of the first end cover is protruded with a plurality of first extending tubes which are communicated with the wastewater outlet and are associated with a position and a quantity of the wastewater tubes, and the first extending tubes are defined to extend into wastewater tubes associated with the first extending tubes and are communicated between the wastewater outlet and the associated wastewater tubes;

an inner side of the first end cover is protruded with a second extending tube which is communicated with the pure water outlet and is associated with a position of the permeate tube, and the second extending tube is defined to extends into the permeate tube and communicates with the pure water outlet and the permeate tube.

In one embodiment, an inner side of the second end cover is protruded with a plurality of first positioning protrusions associated with a position and a quantity of the wastewater tubes, and the first positioning protrusions are configured to extend into the wastewater tubes associated with the first positioning protrusions;

an inner side of the second end cover is protruded with a second positioning protrusion associated with a position of the permeate tube, and the second positioning protrusion configured to extend into the permeate tube.

In one embodiment, a reverse osmosis membrane sheet of each reverse osmosis membrane sheet set is configured to be folded inward on the front surface, and the second portions of the plurality of reverse osmosis membrane sheet sets are overlapped and jointly wound around the central tube set in a peripheral direction; an influx channel is formed between the front surfaces of one same reverse osmosis membrane sheet; a water producing channel is formed between the back surfaces of two adjacent reverse osmosis membrane sheets; the influx guiding net and the wastewater tube are positioned in the influx channel, and the pure water guiding net is positioned in the water producing channel.

In one embodiment, a lateral side of the water producing channel is closed and sealed, except for a side close to the permeate tube, allowing the water producing channel to have a pure water outlet toward the permeate tube.

In one embodiment, the central tube set of the spiral wound reverse osmosis membrane component includes the plurality of wastewater tubes, a quantity of the wastewater tubes is N, and N is greater than or equal to 3. A cross section of the permeate tube is configured as N-polygonal and correspondingly has N lateral surfaces. Each lateral surface is defined with the pure water influx hole. Each wastewater tube is defined at a position corresponding to one of the lateral surfaces. Or a quantity of the wastewater tubes is two. The permeate tube is a flat tube, and the permeate tube has two lateral surfaces. Each of the lateral surfaces is defined with the pure water influx hole. Each of the wastewater tubes is defined at a position corresponding to one of the lateral surfaces.

The present application further provides a filter cartridge, which includes a housing, a waterway converter and a spiral wound reverse osmosis membrane component. The spiral wound reverse osmosis membrane component is received in the housing. The waterway converter is defined with two independent waterways, in which one of the waterways is communicated with a wastewater outlet of the first end cover, and the other of the waterways is communicated with a pure water outlet of the first end cover, in which, the spiral wound reverse osmosis membrane component includes a central tube set and a plurality of reverse osmosis membrane sheet sets, each reverse osmosis membrane sheet set has a first portion positioned inside the central tube set and a second portion positioned outside the central tube set.

In which, the central tube set includes:

a permeate tube, a peripheral wall of the permeate tube being defined with a pure water influx hole communicating with an internal channel of the permeate tube; and a plurality of wastewater tubes defined at intervals, the wastewater tubes being defined around the permeate tube, a peripheral wall of each wastewater tube being defined with a wastewater influx hole communicating with an internal channel of each wastewater tube.

The plurality of the wastewater tubes and the permeate tube are defined at intervals, to form a receiving space between each wastewater tube and the permeate tube, for receiving a portion of the reverse osmosis membrane sheet set which is extending into the central tube set. Each wastewater tube and the permeate tube are divided by the first portion of one of the reverse osmosis membrane sheet sets. The second portion of the plurality of the reverse osmosis membrane sheet set forms a plural membrane assembly surrounding the central tube set.

The present application further provides a reverse osmosis water purifier, which includes a filter cartridge, and the filter cartridge includes a housing, a waterway converter and a spiral wound reverse osmosis membrane component. The spiral wound reverse osmosis membrane component is received in the housing. The waterway converter is defined with two independent waterways, in which one of the waterways is communicated with a wastewater outlet of the first end cover, and the other of the waterways is communicated with a pure water outlet of the first end cover, in which, the spiral wound reverse osmosis membrane component includes a central tube set and a plurality of reverse osmosis membrane sheet sets, each reverse osmosis membrane sheet set has a first portion positioned inside the central tube set and a second portion positioned outside the central tube set.

In which, the central tube set includes:

a permeate tube, a peripheral wall of the permeate tube being defined with a pure water influx hole communicating with an internal channel of the permeate tube; and a plurality of wastewater tubes defined at intervals, the wastewater tubes being defined around the permeate tube, a peripheral wall of each wastewater tube being defined with a wastewater influx hole communicating with an internal channel of each wastewater tube.

The plurality of the wastewater tubes and the permeate tube are defined at intervals, to form a receiving space between each wastewater tube and the permeate tube, for receiving a portion of the reverse osmosis membrane sheet set which is extending into the central tube set. Each wastewater tube and the permeate tube are divided by the first portion of one of the reverse osmosis membrane sheet sets. The second portion of the plurality of the reverse osmosis membrane sheet set forms a plural membrane assembly surrounding the central tube set.

The application also provides a winding method of the spiral coiled reverse osmosis membrane component, which includes the following steps:

Step S1, extending the first portions of a plurality of reverse osmosis membrane sheet sets into a central tube set, in which, the central tube set includes a permeate tube and a plurality of wastewater tubes that are provided at intervals. So each wastewater tube and the permeate tube are separated by the first portion of each reverse osmosis membrane sheet set.

Step S2, winding the second portions of the plurality of reverse osmosis membrane sheet sets around the central tube set.

In which, the spiral wound reverse osmosis membrane component includes: a central tube set and a plurality of reverse osmosis membrane sheet sets. Each reverse osmosis membrane sheet set has a first portion positioned inside the central tube set and a second portion positioned outside the central tube set.

In which, the central tube set includes a permeate tube, a peripheral wall of the permeate tube being defined with a pure water influx hole communicating with an internal channel of the permeate tube; and a plurality of wastewater tubes defined at intervals, the wastewater tubes being defined around the permeate tube, a peripheral wall of each wastewater tube being defined with a wastewater influx hole communicating with an internal channel of each wastewater tube.

The plurality of the wastewater tubes and the permeate tube are defined at intervals, to form a receiving space between each wastewater tube and the permeate tube, for receiving a portion of the reverse osmosis membrane sheet set which is extending into the central tube set. Each wastewater tube and the permeate tube are divided by the first portion of one of the reverse osmosis membrane sheet sets. The second portion of the plurality of the reverse osmosis membrane sheet set forms a plural membrane assembly surrounding the central tube set.

In one embodiment, the step S1 includes:

S11, bypassing the wastewater tube by a reverse osmosis membrane sheet from front to back, then folding forward the reverse osmosis membrane sheet to wind around the wastewater tube, to form an interlayer with the front surface of the reverse osmosis membrane sheet, and placing the influx guiding net in the interlayer to prepare a first assembly; repeating the aforementioned operations to obtain a plurality of the first assemblys.

S12, mounting the permeate tube on a membrane winding machine, and fixing the pure water guiding net defined in front of the permeate tube on the permeate tube.

S13, mounting the first assembly to the permeate tube, allowing the wastewater tube of the first assembly to be defined in front of the permeate tube, and allowing the reverse osmosis membrane sheet and the influx guiding net of the first assembly to be defined overlapped on a previous pure water guiding net.

S14, applying glue to the front edge and the left and right edges of the upper surface of the first assembly which is currently mounted on the permeate tube, and then adhering one piece of the pure water guiding net.

S15, starting the membrane winding machine, driving the permeate tube and the first assembly mounted on the permeate tube to rotate by a preset angle by the membrane winding machine, so that the first assembly currently mounted on the permeate tube presses the previous pure water guiding net down and rotates to the back of the permeate tube;

S16, mounting another first assembly to the permeate tube, allowing the wastewater tube of the first assembly to be defined in front of the permeate tube, and allowing the reverse osmosis membrane sheet and the influx guiding net of the first assembly to be defined overlapped on a previous pure water guiding net of the first assembly.

repeating steps S14 to S16 until a plurality of the first assemblys are mounted in the right place, and proceed to step S17;

S17, applying glue is applied to the front edge and the left and right edges of the upper surface of the last first assembly, and then adhering the last first assembly to the pure water guiding net fixed on the permeate tube in the step S12.

In one embodiment, the step S2 includes:

S21, starting the membrane winding machine to drive the permeate tube and the first assembly mounted on the permeate tube to rotate according to the rotation direction in the step S15, until the second portions of the plurality of reverse osmosis membrane module sets being all wound around the central tube set, after laminating the second portions of the plurality of reverse osmosis membrane module sets.

In one embodiment, the quantity of wastewater tubes is M, and M is greater than or equal to 2. The preset angle is 360/M degree.

The central tube set of the spiral wound reverse osmosis membrane component in the embodiments of the application includes a permeate tube and a plurality of wastewater tubes wound around the permeate tube. Each wastewater tube of the spiral wound reverse osmosis membrane component associates with one reverse osmosis membrane sheet set, so that multi-sheets membrane winding can be realized, and the quantity of flow channels can be increased, improving the feed water flux. And it can be solved that part of the membranes fails to filter due to insufficient osmotic pressure and excessively long membranes sheets. As the central tube set is wound at the central position by the multi-sheet reverse osmosis membrane sheet set, after plugging the two ends of the multi-sheet reverse osmosis membrane sheet set, the feed water flux can be formed where the influx enters at the lateral side of the multi-sheet reverse osmosis membrane sheet set, and wastewater discharges through the middle of the wastewater tube. When the spiral wound reverse osmosis membrane component of the application is applied, the feed water enters through lateral sides, and the flow channel is narrowed, and the influx area is reduced. A small thickness influx guiding net can be adopted to continuously reduce the influx area. The flow length is greatly increased, so that the contacting time between the feed water and the reverse osmosis membrane sheet can be increased, and the recovery rate of the feed water is improved. In the meanwhile, since the influx area of the feed water is reduced, the water flow speed on the surface of the reverse osmosis membrane sheet can be increased, so that the concentration polarization on the surface of the reverse osmosis membrane can be reduced, the polluting speed can be reduced regarding to the spiral wound reverse osmosis membrane component, the feed water recovery rate can be improved. The problem of the feed water waste can be thus improved, realizing high water conservation.

TABLE

Figure 1:
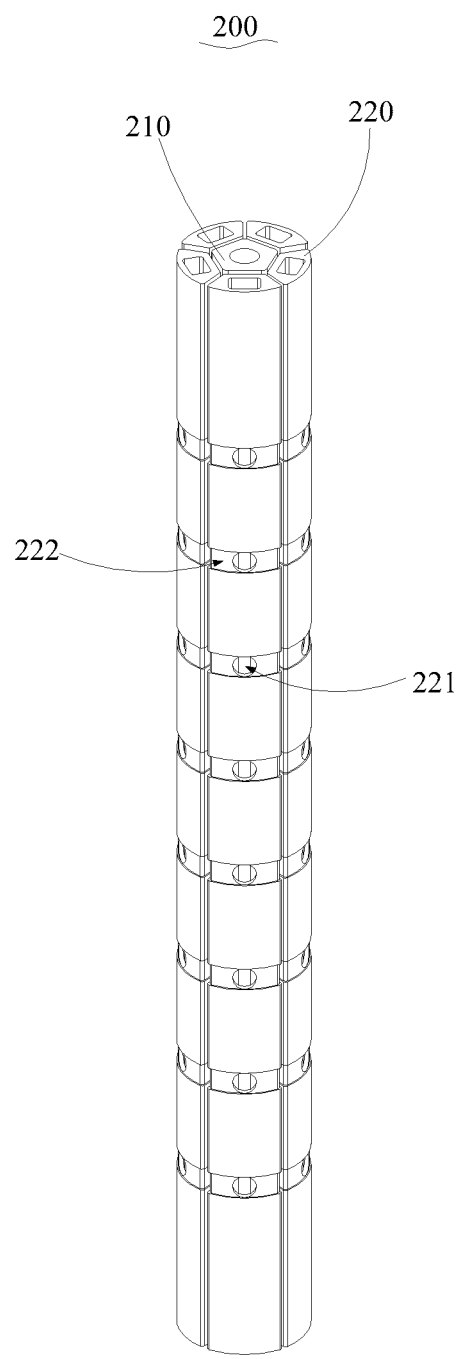
FIG. 1 is a schematic structural diagram of a central tube set according to an embodiment of the present application.

| Reference Numeral | Name | Reference Numeral | Name |
|---|---|---|---|
| 100 | Reverse osmosis membrane sheet set | 110 | Reverse osmosis membrane sheet |
| 120 | Influx guiding net | 130 | Pure water guiding net |
| 200 | Central tube set | 210, 210', 210" | Permeate tube |
| 220, 220', 220" | Wastewater tube | 211 | Pure water influx hole |
| 221 | Wastewater influx hole | 212, 212' | Lateral surface |
| 213 | Arc surface section | 214 | First avoiding opening |
| 215 | First strengthening rib | 222 | Wastewater guiding groove |

TABLE-continued

| Reference Numeral | Name | Reference Numeral | Name |
|---|---|---|---|
| 223 | Second avoiding opening | 224 | First strengthening rib |
| 300 | First assembly | 410 | First connecting portion |
| 420 | Second connecting portion | 411 | Fool-proofing fitting portion |
| 421 | Fixed fitting portion | 510 | Fool-proofing mounting portion |
| 520 | Fixed mounting portion | 601 | Cutting groove |
| 301 | First end cover | 400 | Second end cover |
| 310 | Wastewater outlet | 320 | Pure water outlet |
| 311 | First extending tube | 321 | Second extending tube |
| 401 | First positioning protrusion | 402 | Second positioning protrusion |
| 700 | Spiral wound reverse osmosis membrane component | 800 | Waterway converter |
| 900 | Housing | | |

Reference to the attached drawings in combination with embodiments will follow.

DETAILED DESCRIPTION OF THE EMBODIMENTS

Embodiments of the present application will be described clearly and completely with reference to the drawings in the embodiment of the present application. The described embodiment is only a part of the embodiment of the present application, not all of the embodiments.

It should be noted that if there are directional indications (such as up, down, left, right, front, back, etc.) involved in the embodiment of the present application, the directional indications are only used to explain the relative positional relationship, movement situation, etc. between various components under a certain specific posture (as shown in the drawings), and if the specific posture changes, the directional indications will also change accordingly.

In addition, if there are descriptions related to "first", "second", etc. in the embodiments of the present application, the descriptions of "first", "second", etc. are for descriptive purposes only and cannot be understood as indicating or implying its relative importance or implicitly indicating the quantity of features indicated. Thus, features defining "first" and "second" may explicitly or implicitly include at least one of the features.

Please refer to FIGS. 1 to 10, in which the solid line with arrow indicates a space (hole, notch, cavity, etc.) or a surface. In the embodiment of the present application, the central tube set includes: a permeate tube 210, the peripheral wall of which is provided with a pure water influx hole 211 communicating with the internal channel of the permeate tube 210; a plurality of wastewater tubes 220 defined at intervals, the wastewater tubes 220 are defined around the permeate tube 210, and the peripheral wall of each wastewater tube 220 is provided with a wastewater influx hole 221 communicated with the internal channel of the wastewater tube 220. A plurality of the wastewater tubes 220 and the permeate tube 210 are defined at intervals to form a receiving space between each of the wastewater tubes 220 and the permeate tube 210 for receiving the portion of the reverse osmosis membrane sheet set 100 extending into the central tube set.

The central tube set of the embodiment of the application includes a permeate tube 210 and a plurality of wastewater tubes 220 wound around the permeate tube 210. When the central tube set is applied to the spiral wound reverse osmosis membrane component, each wastewater tube 220 of the spiral wound reverse osmosis membrane component associates with one reverse osmosis membrane sheet set 100, so that multi-sheets membrane winding can be realized, and the quantity of flow channels can be increased, improving the feed water flux. And it can be solved that part of the membranes fails to filter due to insufficient osmotic pressure and excessively long membranes sheets. As the central tube set is wound at the central position by the multi-sheet reverse osmosis membrane sheet set, after plugging the two ends of the multi-sheet reverse osmosis membrane sheet set, the feed water flux can be formed where the influx enters at the lateral side of the multi-sheet reverse osmosis membrane sheet set, and wastewater discharges through the middle of the wastewater tube. Compared with the feed water pathway of a traditional spiral wound reverse osmosis membrane component in which water enters into one end of the spiral wound reverse osmosis membrane component and water discharges at the other end of the spiral wound reverse osmosis membrane component, when the spiral wound reverse osmosis membrane component of the central tube set is applied, the feed water enters through lateral sides, and the flow channel is narrowed, and the influx area is reduced. A small thickness influx guiding net can be adopted to continuously reduce the influx area. The flow length is greatly increased, so that the contacting time between the feed water and the reverse osmosis membrane sheet can be increased, and the recovery rate of the feed water is improved. In the meanwhile, since the influx area of the feed water is reduced, the surface water flow velocity of the reverse osmosis membrane can be increased (when the influx is constant, the relationship between the influx Q and the water flow velocity V is $V=Q/S$, where S is the influx area, $S=L*D$; where L is the length of the membrane at the inlet end, D is the thickness of the cross section. The lateral flow mainly reduces L, and in addition, the thickness d is naturally reduced by using a small inlet net), so that the concentration polarization on the surface of the reverse osmosis membrane can be reduced, the polluting speed can be reduced regarding to the spiral wound reverse osmosis membrane component, the feed water recovery rate can be improved. The problem of the feed water waste can be thus improved, realizing high water conservation.

The specific quantity of wastewater tubes 220 determines the quantity of sheets of the reverse osmosis membrane set 100 and also determines the size of the permeate tube 210. In one embodiment, one sheet of reverse osmosis membrane module 100 is defined to associate with one wastewater tube 220. The more wastewater tubes 220, the more sheets of the reverse osmosis membrane module 100, the greater the flux of the corresponding spiral wound reverse osmosis membrane component, and the larger the size of the permeate tube 210. The specific quantity and shape of wastewater tubes 220 and the shape of associated permeate tube 210 can be set according to actual conditions with reference to the following specific embodiments.

Figure 2:
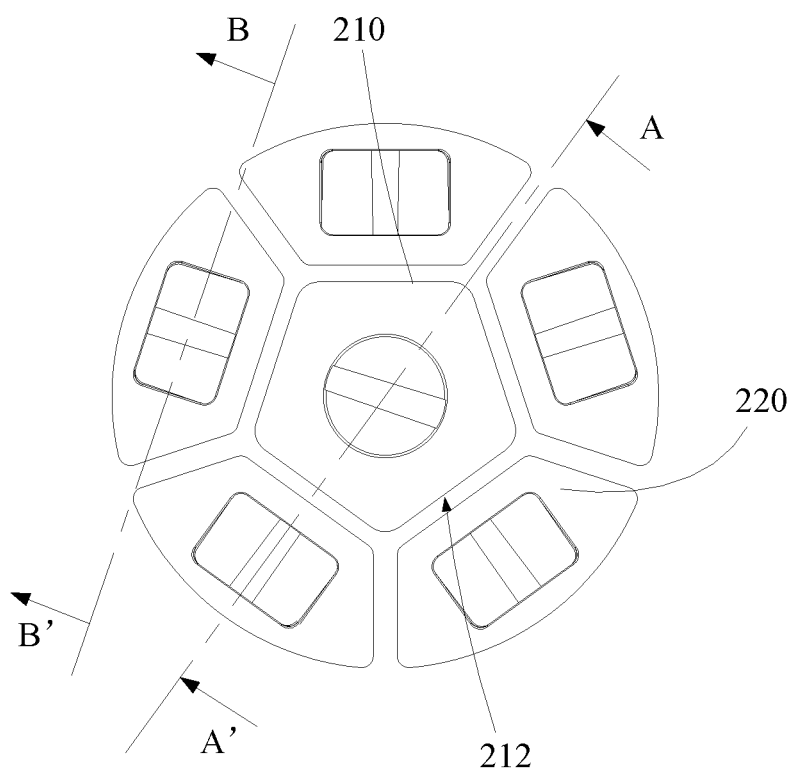
FIG. 2 is a top plan view of the central tube set shown in FIG. 1.
Figure 3:
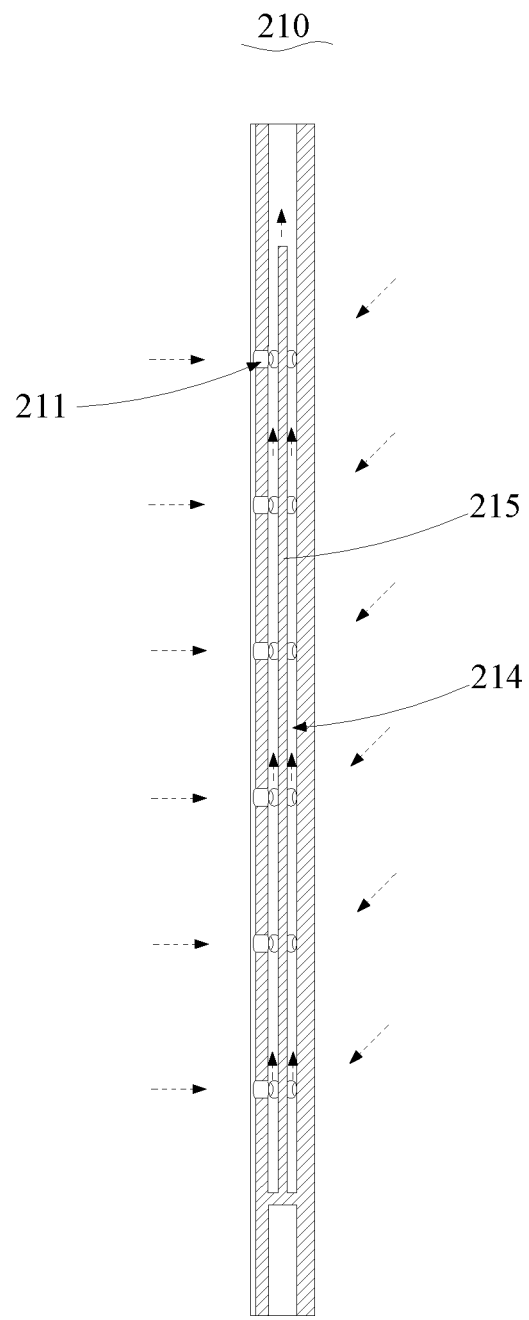
FIG. 3 is a cross-sectional view of the permeate tube in the central tube set shown in FIG. 2 along line A-A'.
Figure 5:
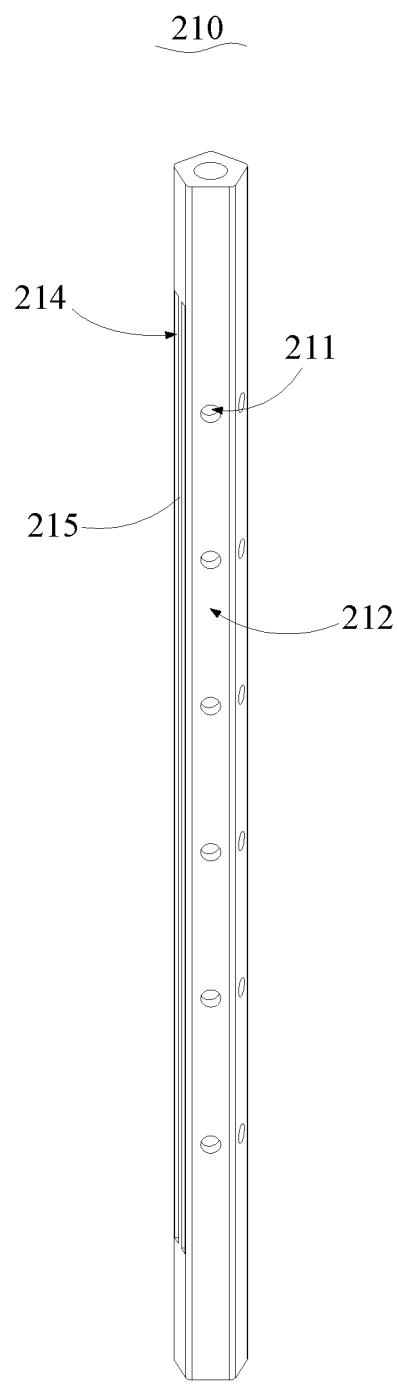
FIG. 5 is a schematic structural view of a permeate tube of the central tube set shown in FIG. 1.
Figure 6:
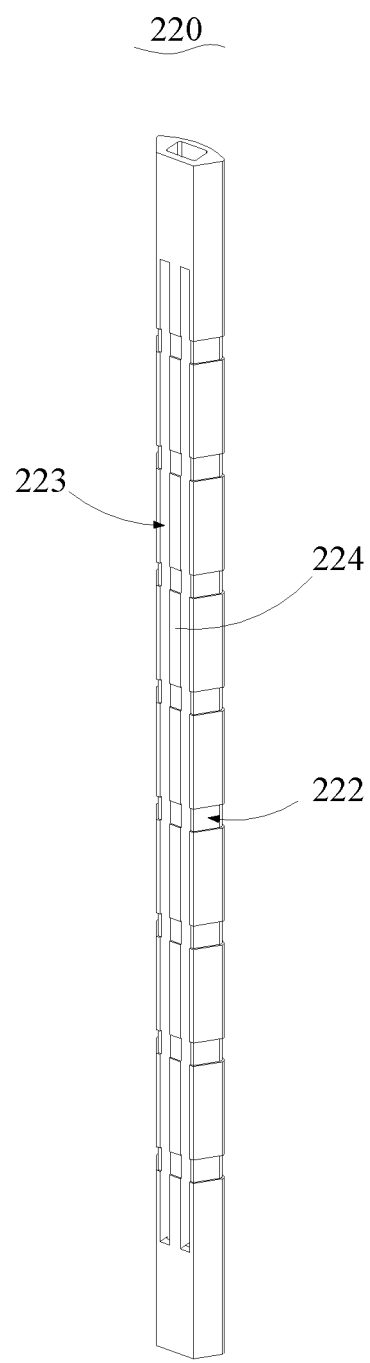
FIG. 6 is a schematic structural view of the wastewater tube of the central tube set shown in FIG. 1.

Referring to FIGS. 1 to 3, in one embodiment of the present application, the quantity of wastewater tubes 220 is N, and N is greater than or equal to 3. The cross section of the permeate tube 210 is defined N polygonal and accordingly has N lateral surfaces 212, and each lateral surface 212 is provided with the pure water influx hole 211. Each of the wastewater tubes 220 is disposed at a position associated with one of the lateral surfaces 212. At this time, the side of each of the wastewater tubes 220 facing the lateral surface 212 may be surface, which facilitates the reverse osmosis membrane sheet set 100 to extend and wind. In one embodiment, in the present embodiment, N=5, i.e., the quantity of wastewater tubes 220 is 5, and the cross section of the permeate tube 210 is generally defined in a regular pentagon, associated with having five lateral surfaces 212, and each of the wastewater tubes 220 is defined associated with the position of one of the lateral surfaces 212. This arrangement can ensure that each wastewater tube 220 associates with one lateral surface 212 of the permeate tube 210 separately, and will not interfere with each other during the membrane winding, thus facilitating the membrane winding. Referring to FIGS. 5 and 6, in order to ensure that the permeate produced by the reverse osmosis membrane module 100 associated with each wastewater tube 220 can be collected into the permeate tube 210 in time, on one embodiment arrangement of a plurality of the pure water influx holes 211 on each lateral surface 212 at intervals, and the plurality of the pure water influx holes 211 are uniformly arranged along the length direction of the permeate tube 210, so that the permeate at each position can quickly flow into the closer pure water influx holes 211. In order to remove wastewater in time, a plurality of wastewater influx holes 221 are defined on each wastewater tube 220 at intervals to enter the internal channel of the wastewater tube 220, and the plurality of wastewater influx holes 221 are uniformly arranged along the length direction of the wastewater tube 220, so that wastewater at each position can quickly flow into the closer wastewater influx holes 221 to enter the internal channel of the wastewater tube 220.

Figure 7:
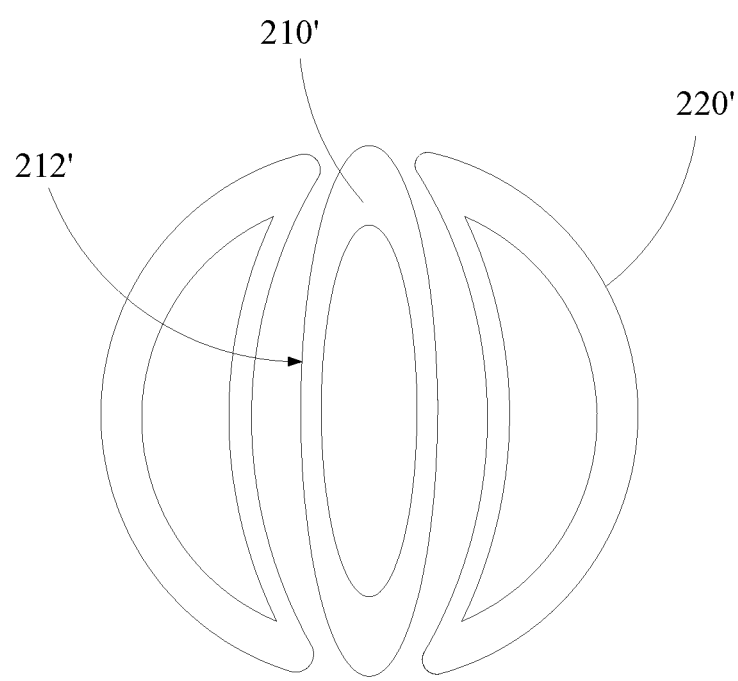
FIG. 7 is a top plan view of a central tube set according to another embodiment of the present application.

Referring to FIG. 7, in another embodiment of the present application, the quantity of wastewater tubes 220' is two. The permeate tube 210' is a flat tube, so that the permeate tube 210' has two lateral surfaces 212', and each lateral surface 212' is provided with the pure water influx hole (not shown). Each of the wastewater tubes 220' is disposed at a position associated with one of the lateral surfaces 212'. At this time, the side of each of the wastewater tubes 220' facing the lateral surface 212' may be flat or curved surface. This arrangement can ensure that each wastewater tube 220' associates with one lateral surface 212' of the permeate tube 210' separately, and will not interfere with each other during membrane winding operation, thus facilitating membrane winding operation. In the meanwhile, the structure is the simple, and the quantity of wastewater tubes 220' is small. It is convenient for production, which is more suitable for the membrane component with a small flux. In which, in order to ensure that the permeate produced by the reverse osmosis membrane unit 100 associated with each wastewater tube 220' can be collected into the permeate tube 210' in time, in one embodiment arrangement of a plurality of the pure water influx holes on each lateral surface 212' at intervals, and the plurality of the pure water influx holes are uniformly defined along the length direction of the permeate tube 210' (referring to the embodiment shown in FIG. 1). As such, the permeate at each position can quickly flow into the near pure water influx holes. In order to remove wastewater in time, a plurality of wastewater influx holes (not shown) are defined on each wastewater tube 220' at intervals to enter the internal channel of the wastewater tube 220', and the plurality of wastewater influx holes are uniformly defined along the length direction of the wastewater tube 220', so that wastewater at each position can quickly flow into its adjacent wastewater influx holes to enter the internal channel of the wastewater tube 220'.

Figure 8:
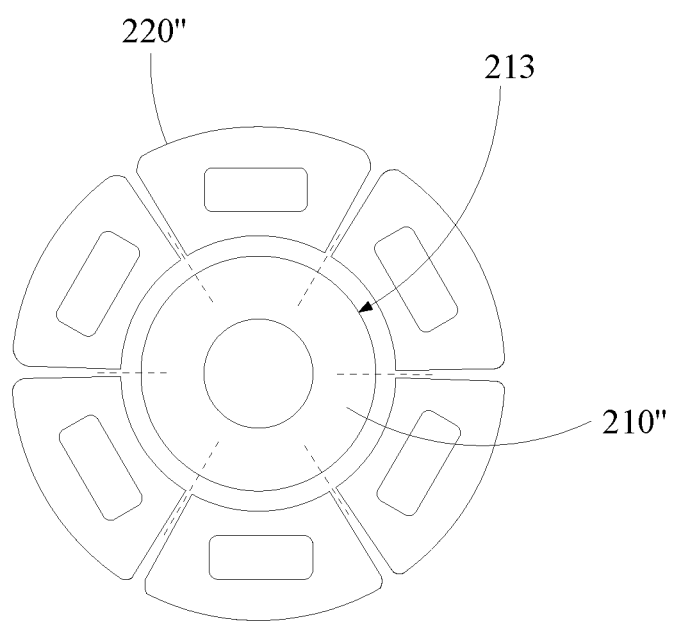
FIG. 8 is a top plan view of a central tube set according to another embodiment of the present application.

Referring to FIG. 8, in another embodiment of the present application, the cross section of the permeate tube 210" is defined in a circular shape, and the peripheral wall of the permeate tube 210" is divided (divided by dashed lines in the figure) into a plurality of arc surface sections 102 along its peripheral direction associated with the plurality of wastewater tubes 220", and each arc surface section 102 is provided with the pure water influx hole (not shown). Each of the wastewater tubes 220" is disposed at a position associated with one of the arc surface sections 102. In the present embodiment, the quantity of wastewater tubes 220" is 6, and the peripheral wall of the permeate tube 210" is divided into 6 arc surface sections 102 along its peripheral direction associated with a plurality of wastewater tubes 220", and each wastewater tube 220" is defined associated with a position of one arc surface section 102. This arrangement can ensure that each wastewater tube 220" associates with one arc surface section 102 of the permeate tube 210" separately, and will not interfere with each other during membrane winding operation, thus facilitating membrane winding operation. In order to ensure that the permeate produced by the reverse osmosis membrane unit 100 associated with each wastewater tube 220" can be collected into the permeate tube 210" in time, in one embodiment arrangement of a plurality of the pure water influx holes on each arc surface section 102 at intervals, and the plurality of the pure water influx holes are uniformly defined along the length direction of the permeate tube 210" (referring to the embodiment shown in FIG. 1), so that the permeate at each position can quickly flow into its adjacent pure water influx holes 211. In order to remove wastewater in time, a plurality of wastewater influx holes (not shown) are defined on each wastewater tube 220" at intervals to enter the internal channel of the wastewater tube 220", and the plurality of wastewater influx holes are uniformly defined along the length direction of the wastewater tube 220", so that wastewater at each position can quickly flow into its adjacent wastewater influx holes to enter the internal channel of the wastewater tube 220".

Referring to FIGS. 1 and 8, in order to facilitate the membrane winding operation, the permeate tube 210 and a plurality of wastewater tubes 220 can be defined to jointly form a cylinder shape. When the membrane is wound, the central tube set is evenly rotated and is not likely to incline. Meanwhile, the appearance of the wound product is relatively uniform, and the wound product is convenient to install into the housing of the spiral wound reverse osmosis membrane component, and the end cover of the spiral wound reverse osmosis membrane component is convenient to align and plug with the wound product.

Figure 4:
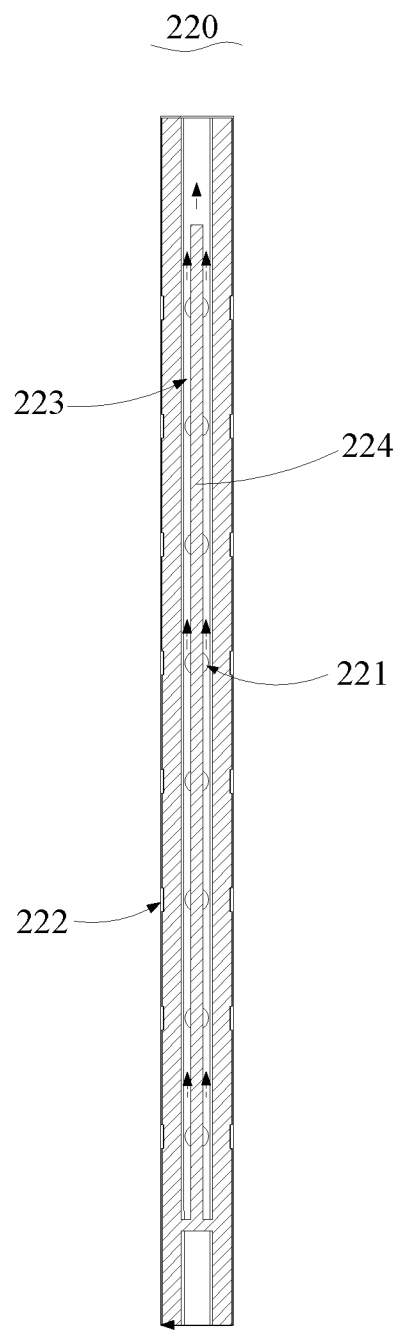
FIG. 4 is a cross-sectional view of the wastewater tube in the central tube set shown in FIG. 2 along line B-B'.

In order to achieve a better guiding effect, in the central tube set of the present application, please refer to FIGS. 4 and 6. The peripheral wall of the wastewater tube 220 is provided with a wastewater guiding groove 222, and the wastewater influx hole 221 is provided in the wastewater guiding groove 222. The specific location, shape and quantity of wastewater guiding groove 222 can be selected according to specific conditions. In the present embodiment, the wastewater tube 220 is provided with a plurality of wastewater guiding groove 222 extending along the peripheral direction of the wastewater tube 220 at intervals. In each wastewater guiding groove 222 is provided with a wastewater influx hole 221. The wastewater guiding groove 222 have water collection and diversion effects, and can help wastewater enter the wastewater tube 220 more accurately and quickly. Other configuration of wastewater guiding groove 222 may also achieve water collection and diversion effects, and are not further limited herein.

In actual production of permeate tube 210, since permeate tube 210 is generally long and small in radius, it is difficult for the inner slide block to pull the core along the axial direction during production, resulting in a slow production of the permeate tube 210. To solve this problem, please refer to FIG. 5. In the central tube set of guiding groove, the peripheral wall of permeate tube 210 is provided with a first avoiding opening 214 extending along the length direction of permeate tube 210. During the production of the permeate tube 210, the entire inner slide block can be divided into upper, middle and lower slide blocks, the middle slide block can pull core from the lateral side through the first avoiding opening 214, and the upper and lower slide blocks can pull core through both ends respectively, thus greatly reducing the production difficulty, which is beneficial to the rapid mass production of the permeate tube 210. In the meanwhile, the first avoiding opening 214 can also function as a pure water influx hole for permeate to enter the internal channel of the permeate tube 210. Since the entire peripheral wall of the permeate tube 210 will be pressed during membrane winding, in order to prevent the deformation at the first avoiding opening 214 of the membrane after it is pressed, a first strengthening rib 215 is provided in the first avoiding opening 214, and both ends of the first strengthening rib 215 are respectively connected to two different sides of the first avoiding opening 214. The membrane of the reverse osmosis membrane sheet set 100 is supported by the first strengthening rib 215, which can effectively prevent the first yielding opening 214 of the membrane of the reverse osmosis membrane sheet set 100 from being pressed into during the filtration process and being crushed, further reducing the desalting rate. In the present embodiment, the first strengthening rib 215 extends along the length direction, and both ends of the first strengthening rib 215 are respectively connected to the two short sides of the first yielding opening 214. In one embodiment, the arrangement mode of the first strengthening ribs 215 is not limited to the specific mode of the present embodiment. As long as it can be a structure that implements support, without affecting smooth waterway, production and molding, it can be applied to embodiments of the present application. The specific arrangement quantity, position and shape of the first strengthening ribs 215 can be selected according to actual needs, and will not be described herein.

When producing the wastewater tube 220, considering the core pulling process, the arrangement mode of the permeate tube 210 can be referred to. Referring to FIG. 6, the peripheral wall of the wastewater tube 220 is provided with a second avoiding opening 223 extending along the length direction of the wastewater tube 220, thus reducing the production difficulty of the wastewater tube 220 and facilitating the mass production of the wastewater tube 220. In the meanwhile, the second avoiding opening 223 can also function as a wastewater influx hole for wastewater to enter the internal channel of the wastewater tube 220. In order to prevent deforming the membrane sheet at the wastewater tube 220 at the second avoiding opening 223 after being pressed, in the present embodiment, the second avoiding opening 223 is arranged at the side of the wastewater tube 220 facing the permeate tube 210. The stress at this point is relatively small, and damage is less unlikely to occur. A second strengthening rib 224 may also be provided in the second avoiding opening 223, and both ends of the second strengthening rib 224 are respectively connected with two different edges of the second avoiding opening 223. The membrane sheet of the reverse osmosis membrane sheet set 100 is supported by the second strengthening rib 224, which can effectively prevent the membrane of the reverse osmosis membrane sheet set 100 from being pressed into the second avoiding opening 223 during the filtration process, thus causing reduction of desalting rate. As long as it can be a structure that implements support, without affecting smooth waterway, production and molding, it can be applied to the second strengthening ribs 224 of the embodiments of the present application. The specific arrangement quantity, position and shape of the second strengthening ribs 224 can be selected according to actual needs, and will not be described herein.

In order to collect permeate conveniently, please refer to FIG. 3. One end of the permeate tube 210 may be plugged to allow permeate to flow to the other end of the permeate tube 210. As such, the flow direction of permeate is fixed, and permeate can be reliably collected. In order to facilitate the discharge of wastewater, please refer to FIG. 4. At least one end of the wastewater tube 220 can be designed plugged, so that wastewater flows to the other end of the wastewater tube 220. After plugging, the wastewater will flow in a fixed direction and can be collected reliably. In one embodiment, one end of the permeate tube 210 is plugged, and one end of each wastewater tube 220 is plugged. The plugged end of the permeate tube 210 and the plugged end of the wastewater tube 220 are on the same side. In actual application, the spiral wound reverse osmosis membrane component is generally vertically placed, and the corresponding permeate tube 210 and a plurality of wastewater tubes 220 are also placed along the vertical direction. As such, the lower end of the permeate tube 210 is normally plugged, and the lower ports of a plurality of wastewater tubes 220 are plugged, so that permeate and wastewater are collected from the upper end, the water flow is even, enabling a convenient tube line design. Regarding to specific flow conditions, please refer to FIGS. 3 and 4, in which the dashed line with arrow indicates the direction of water flow. Permeate enters the permeate tube 210 from the pure water influx hole 211 and flows out of the permeate tube 210 upward along the permeate tube 210 water pathway. Wastewater enters the wastewater tube 220 from the wastewater influx hole 221 and flows out of the wastewater tube 220 upward along the wastewater tube 220 wastewater pathway.

The present application further provides a spiral wound reverse osmosis membrane component.

Figure 9:
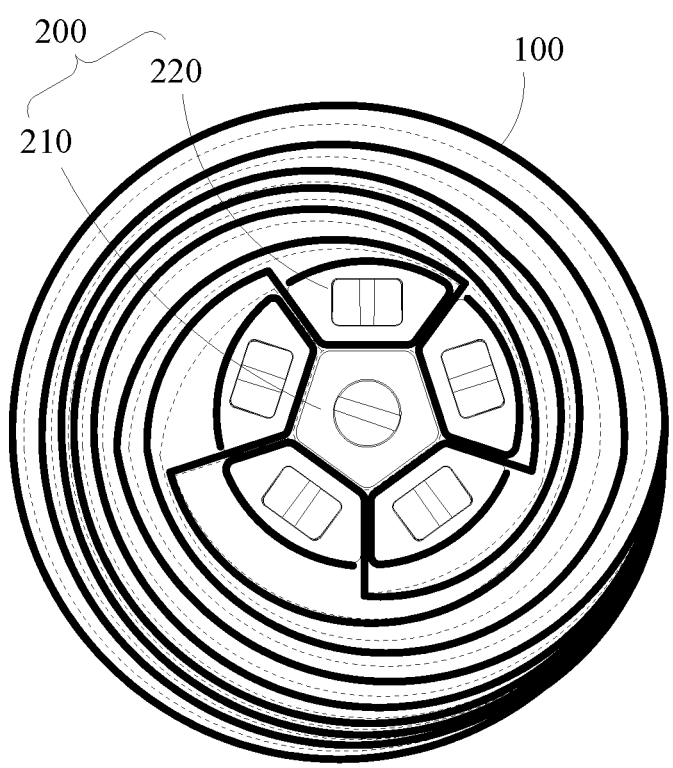
FIG. 9 is a top plan view of a spiral wound reverse osmosis membrane component according to an embodiment of the present application.
Figure 10:
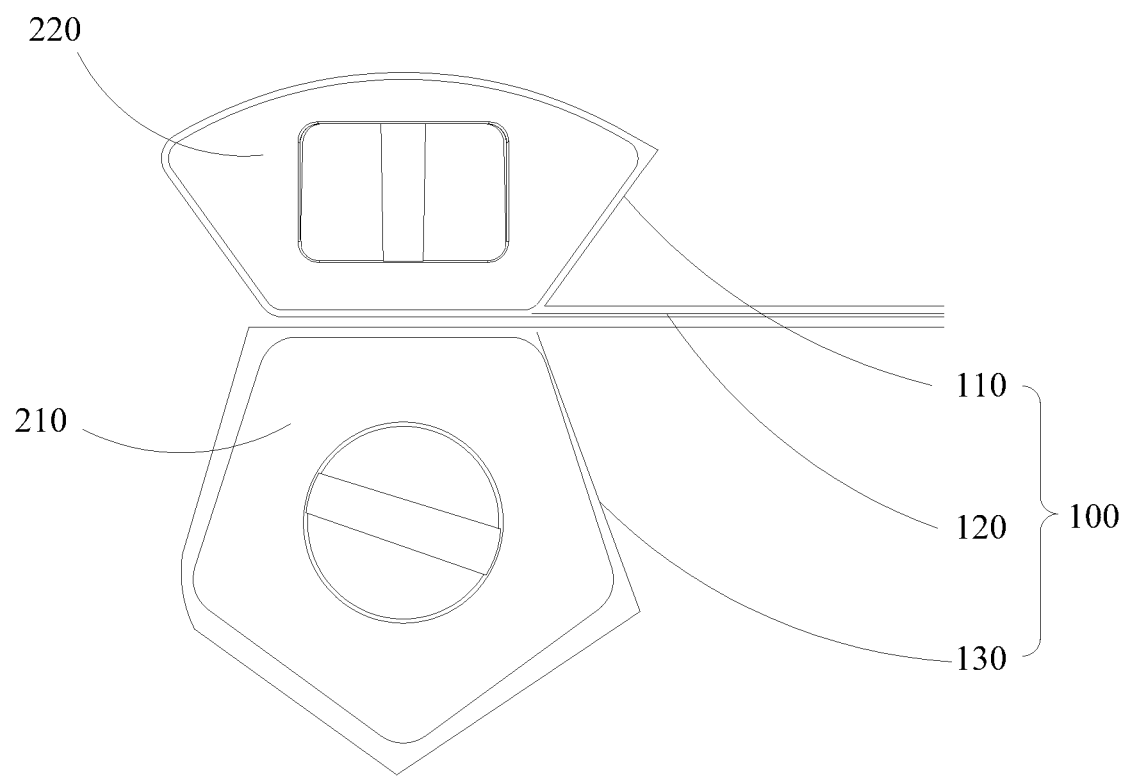
FIG. 10 is a top plan view of a reverse osmosis membrane sheet set of the spiral wound reverse osmosis membrane component shown in FIG. 9 coordinated with a wastewater tube and a permeate tube.

Referring to FIGS. 9 and 10, in the embodiment of the present application, the spiral wound reverse osmosis membrane component comprises a plurality of reverse osmosis membrane sheet sets 100 and a central tube set 200. Each of the reverse osmosis membrane sheet sets 100 comprises a reverse osmosis membrane sheet 110, an influx guiding net 120 and a pure water guiding net 130. The influx guiding net 120 and the pure water guiding net 130 are respectively arranged on the front and back surfaces of the reverse osmosis membrane sheet 110. The central tube set 200 includes a permeate tube 210 and a plurality of wastewater tubes 220 arranged at intervals, and the plurality of wastewater tubes 220 are defined around the permeate tube 210. In which, each reverse osmosis membrane sheet set 100 has a first portion positioned inside the central tube set 200 and a second portion positioned outside the central tube set 200. Each wastewater tube 220 and the permeate tube 210 are divided by the first portion of one of the reverse osmosis membrane sheet sets 100. The second portion of the plurality of the reverse osmosis membrane sheet set 100 forms a plural membrane assembly surrounding the central tube set 200. In which, the influx guiding net 120 of each reverse osmosis membrane sheet set 100 does not contact with the permeate tube 210 and the back surface of reverse osmosis membrane sheet of the other reverse osmosis membrane sheet sets 100. The pure water guiding net 130 of each reverse osmosis membrane sheet set 100 does not contact with the wastewater tube and the front surface of reverse osmosis membrane sheet 110 of the other reverse osmosis membrane sheet sets 100.

The specific structure of the central tube set of the spiral wound reverse osmosis membrane component according to the embodiments of the application refers to the aforementioned-mentioned embodiment. Since the spiral wound reverse osmosis membrane component adopts embodiments of the present application. The influx guiding net 120 and the pure water guiding net 130 are respectively arranged on the front surface and the back surface of the reverse osmosis membrane 110, feed water flows on the front surface of the reverse osmosis membrane 110, and permeate filters from the front surface of the reverse osmosis membrane 110 to the back surface of the reverse osmosis membrane 110 under the action of osmotic pressure. The permeate is generated on the back surface of the reverse osmosis membrane 110 and flows to the permeate tube 210 under diversion of the pure water guiding net 130. In which, the reverse osmosis membrane 110 can be folded in half so that the front surfaces are adjacent to each other and the back surfaces are adjacent to each other to avoid undesirable contact, thereby preventing permeate from being polluted. In actual application, the reverse osmosis membrane 110 can be folded in half with the front surface folded inward or with the back face folded inward, and can be reasonably selected according to actual conditions. Referring further to FIG. 10, in the present embodiment, a reverse osmosis membrane sheet 110 of each reverse osmosis membrane sheet set 100 is arranged being folded inward on the front surface, and the second portions of the plurality of reverse osmosis membrane sheet sets 100 are overlapped and jointly wound around the central tube set 200 in a peripheral direction. A influx channel is formed between the front surface of one same reverse osmosis membrane sheet 110. A water producing channel is formed between the back surface of two adjacent reverse osmosis membrane sheets 110. The influx guiding net 120 and the wastewater tube 220 are positioned in the influx channel, and the pure water guiding net 130 is positioned in the water producing channel. As such, the influx channel and the water producing channel are mutually independent and completely isolated, which can effectively ensure that the influx guiding net 120 of each reverse osmosis membrane sheets 100 does not contact with the back surface of the permeate tube 210 and other reverse osmosis membrane sheets 110 of the reverse osmosis membrane sheet set 100. The pure water guiding net 130 of each of the reverse osmosis membrane modules 100 does not contact the front surface of the wastewater tube 220 and other reverse osmosis membrane modules 110 of the reverse osmosis membrane module 100. Feed water flows only in the influx channel and is finally discharged from the wastewater tube 220, while permeate flows only in the water producing channel and is finally discharged from the permeate tube 210, thus avoiding permeate pollution and ensuring purification effect.

In order to smoothly discharge the permeate, in the present embodiment, lateral sides of the water producing channel is closed and sealed, except for a side close to the permeate tube 210, allowing the water producing channel to have a pure water outlet toward the permeate tube 210. As such, the water producing channel forms a membrane bag with three sides sealed and one side open, and opening of the membrane bag faces the permeate tube 210, which limits the permeate in the membrane bag to flow only towards the permeate tube 210. The feed water generates permeate after the reverse osmosis membrane 110, and the permeate is formed in the membrane bag and flows to the opening of membrane bag into the permeate tube 210.

Figure 11:
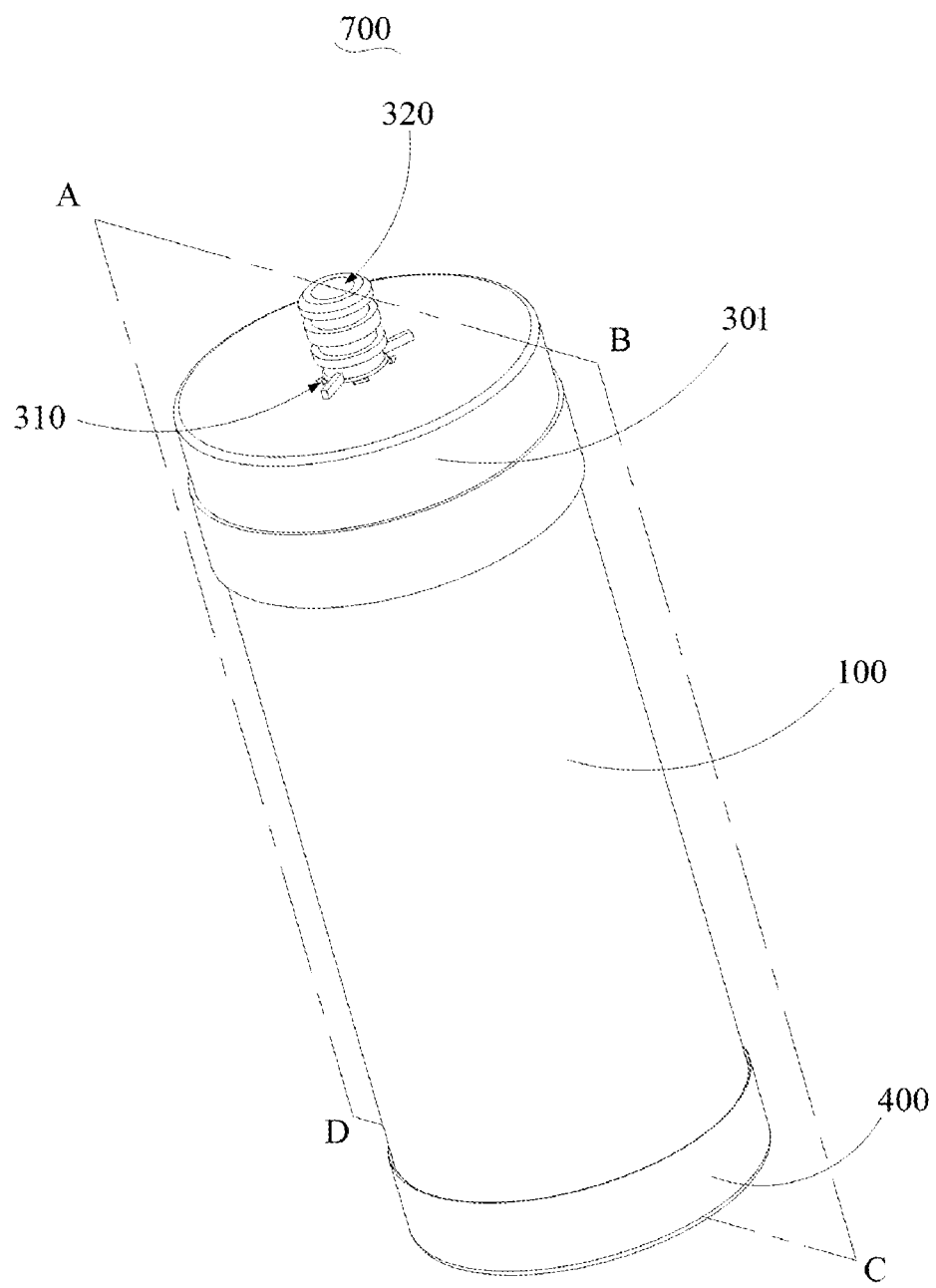
FIG. 11 is a schematic structural diagram of another embodiment of the spiral wound reverse osmosis membrane component of the present application.
Figure 12:
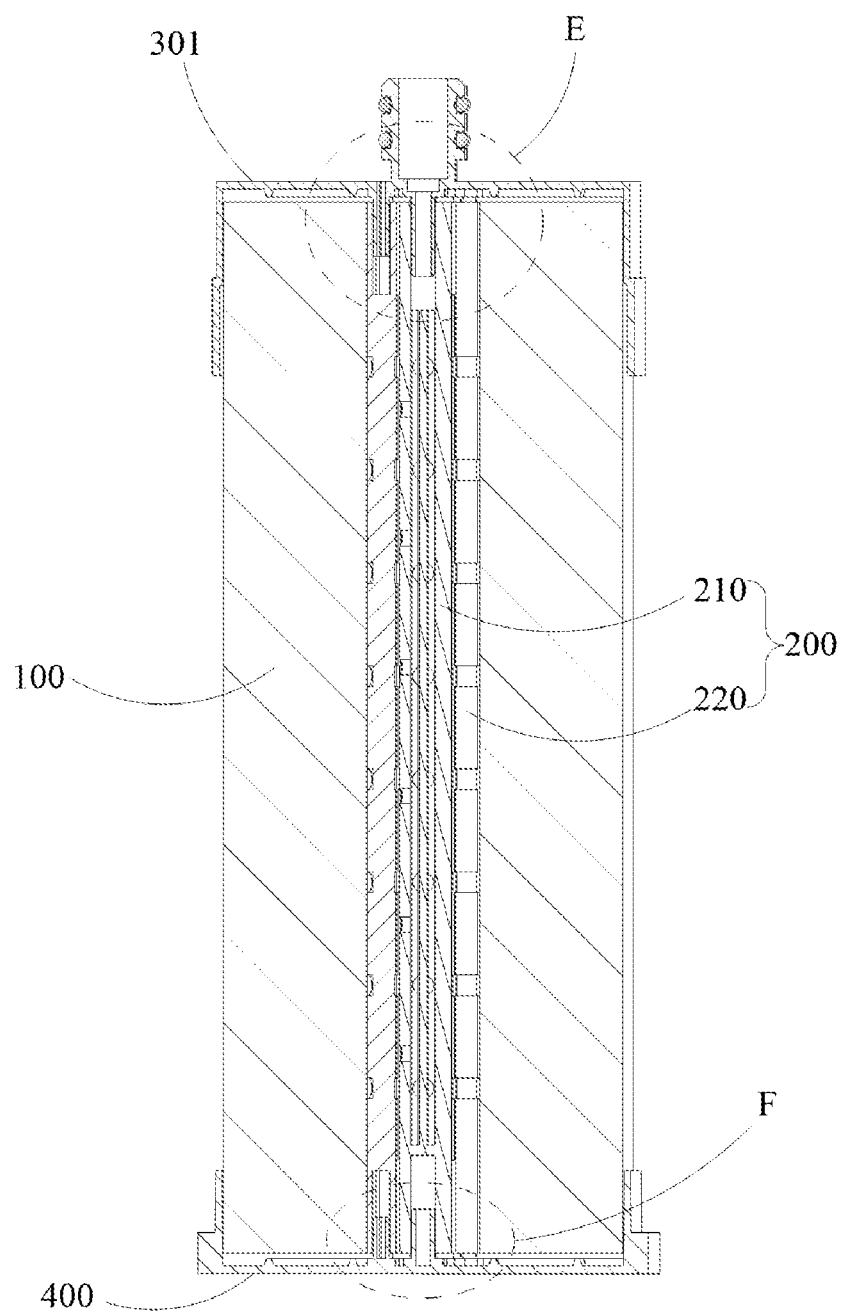
FIG. 12 is a sectional view taken along line A-B-C-D in FIG. 11.

Please refer to FIGS. 11 and 12, which illustrate another embodiment of the spiral wound reverse osmosis membrane component. In which, the solid line with arrow indicates the space such as surface or hole, mouth, etc. In the embodiment of the application, the spiral wound reverse osmosis membrane component 700 comprises a multi-sheet reverse osmosis membrane sheet set 100, a central tube set 200, a first end cover 301 and a second end cover 400. The central tube set 200 includes a permeate tube 210 and a plurality of wastewater tubes 220 arranged at intervals, and the wastewater tubes 220 are arranged around the permeate tube 210. The peripheral wall of the permeate tube 210 is provided with a pure water influx hole 211 communicating with the internal channel of the permeate tube 210, and the peripheral wall of each wastewater tube 220 is provided with a wastewater influx hole 221 communicating with the internal channel of the wastewater tube 220. Each reverse osmosis membrane sheet set 100 has a first portion positioned inside the central tube set 200 and a second portion positioned outside the central tube set 200. Each wastewater tube 220 and the permeate tube 210 are divided by the first portion of one of the reverse osmosis membrane sheet sets 100. The second portion of the plurality of the reverse osmosis membrane sheet set 100 forms a plural membrane assembly surrounding the central tube set 200. The first end cover 301 and the second end cover 400 are respectively sleeved at both ends of the central tube set 200 and the multi-sheet reverse osmosis membrane sheet set 100 to position the central tube set 200 and the reverse osmosis membrane sheet set 100. The first end cover 301 is provided with a wastewater outlet 310 and a pure water outlet 320 (see FIGS. 11 and 12); In one embodiment, the first end cover 301 is provided with a wastewater outlet, and the second end cover 400 is provided with a pure water outlet (this arrangement is not shown); The wastewater tube 220 is connected to the wastewater outlet 310, and the permeate tube 210 is connected to the pure water outlet 320. The first end cover 301 is arranged with a wastewater outlet 310 and a pure water outlet 320 (referring to FIGS. 11 and 12). Or, the first end cover 301 is defined with a wastewater outlet 310, and the second end cover 400 is defined with a pure water outlet 320 (not shown in the figures). The wastewater tube 220 is connected with the wastewater outlet 310 and the permeate tube 210 is connected with the pure water outlet 320.

The central tube set 200 of the spiral wound reverse osmosis membrane component 700 according to embodiments of the application includes a permeate tube 210 and a plurality of wastewater tubes 220 wound around the permeate tube 210. Each wastewater tube 220 of the spiral wound reverse osmosis membrane component associates with one reverse osmosis membrane sheet set 100, so that multi-sheets membrane winding can be realized, and the quantity of flow channels can be increased, improving the feed water flux. And it can be solved that part of the spiral wound reverse osmosis membrane sheets fail to filter due to insufficient osmotic pressure and excessively long spiral wound reverse osmosis membranes sheets. The first end cover 301 and the second end cover 400 clamp the two ends of the central tube set 200 and the reverse osmosis membrane sheet set 100 respectively for positioning, and at the same time, the first end cover 301 is provided with a pure water outlet 320 and a wastewater outlet 310 to form a flow channel communicated with the corresponding tube line of the central tube set 200. After the first end cover 301 and the second end cover 400 plug the two ends of the reverse osmosis membrane sheet set 100, since the central tube set 200 is wound around the center position by the multi-sheet reverse osmosis membrane sheet set 100, the feed water flux can be formed where the influx enters at the lateral side of the multi-sheet reverse osmosis membrane sheet set, and wastewater discharges through the middle of the wastewater tube. When the spiral wound reverse osmosis membrane component 700 is applied, the feed water enters through lateral sides, and the flow channel is narrowed, and the influx area is reduced. A small thickness influx guiding net 120 can be adopted to continuously reduce the influx area. The flow length is greatly increased, so that the contacting time between the feed water and the reverse osmosis membrane sheet 110 can be increased, and the recovery rate of the feed water is improved. In the meanwhile, since the influx area of the feed water is reduced, the surface water flow velocity of the reverse osmosis membrane can be increased (when the influx is constant, the relationship between the influx Q and the water flow velocity V is $V=Q/S$, where S is the influx area, $S=L*D$; where L is the length of the membrane at the influx end, D is the thickness of the cross section. The lateral flow mainly reduces L, and in addition, the thickness D is naturally reduced by using a small influx net), so that the concentration polarization on the surface of the reverse osmosis membrane can be reduced, the polluting speed can be reduced regarding to the spiral wound reverse osmosis membrane component, the feed water recovery rate can be improved. The problem of the feed water waste can be thus improved, realizing high water conservation.

The wastewater outlet 310 and the pure water outlet 320 can be arranged at a same end cover (the first end cover 301 or the second end cover 400) or can be respectively defined on different end covers, so as to discharge wastewater and permeate. In the present embodiment, please refer to FIGS. 11, 12 and 15. In one embodiment, the wastewater outlet 310 and the pure water outlet 320 are both arranged on the first end cover 301. At this time, the wastewater outlet 310 and the pure water outlet 320 are both defined on the same side. When the corresponding filter cartridge is designed for waterway, only one waterway converter 800 needs to be arranged associated with the first end cover 301, enabling to simplify the structure of the corresponding filter cartridge.

In order to make the fixing more reliable regarding to the first end cover 301 and the second end cover 400, in the present embodiment, it may be provided that the inner side of the first end cover 301 is coated with a sealant, and the first end cover 301 and the reverse osmosis membrane sheet set 100 are adhered and sealed by the sealant. Likewise to the setting of the first end cover 301, in the present embodiment, the inner sides of both the inner sides of the second end cover 400 are coated with sealant, and the second end cover 400 and the reverse osmosis membrane sheet set 100 are adhered and sealed by the sealant. After adhesion, the first end cover 301 and the second end cover 400 are not easy to fall off and the installation reliability is greatly improved. At the same time, the sealant plugs both ends of the reverse osmosis membrane sheet set 100 to prevent water from flowing toward the first end cover 301 or the second end cover 400, thereby enabling a water pathway in which water enters one side and discharges in the middle.

Figure 13:
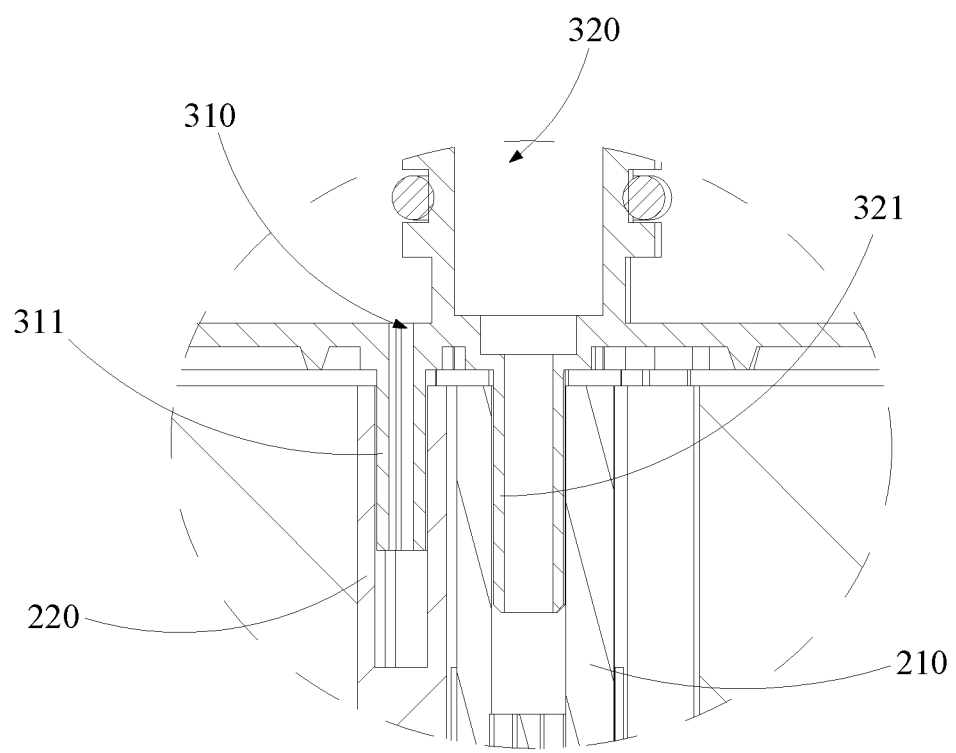
FIG. 13 is an enlargement view of Point E shown in FIG. 12.
Figure 15:
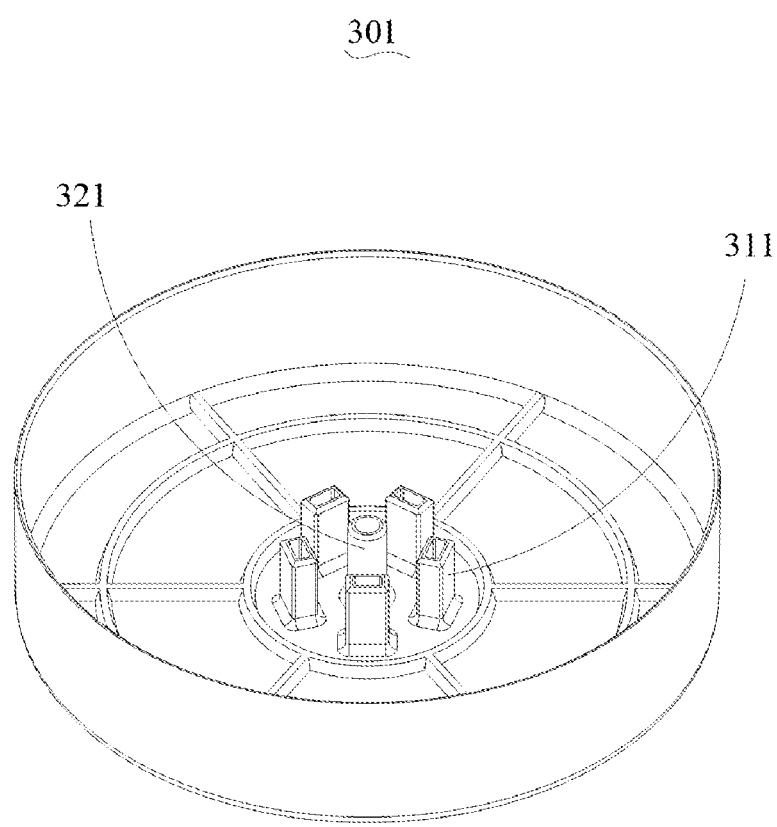
FIG. 15 is a schematic structural view of the first end cover of the spiral wound reverse osmosis membrane component shown in FIG. 11.

Referring to FIGS. 13 and 15, in order to match the wastewater tube 220 with the wastewater outlet 310, the inner side of the first end cover 301 is protruded with a plurality of first extending tubes 311 communicating with the wastewater outlet 310, and the first extending tubes 311 extend into the corresponding wastewater tube 220 to communicate with the wastewater outlet 310 and the wastewater tube 220. In one embodiment, one end of the first extending tube 311 extends into the wastewater tube 220 to be communicated with the wastewater tube 220, and the other end of the first extending tube 311 is communicated with the wastewater outlet 310, thus enabling the communication of the water channels. In the meanwhile, the first extending tube 311 also has a positioning function, which can assist the alignment of the first end cover 301 and the central tube set 200, and improve the structural compactness and reliability of the spiral wound reverse osmosis membrane component 700. In order to match the permeate tube 210 with the pure water outlet 320, a second extending tube 321 communicating with the pure water outlet 320 is protruded on the inner side of the first end cover 301 associated with the position of the permeate tube 210, and the second extending tube 321 extends into the permeate tube 210 to communicate with the pure water outlet 320 and the permeate tube 210. The function and effect of the second extending tube 321 can be similar to that of the first extending tube 311 and will not be described herein.

Figure 14:
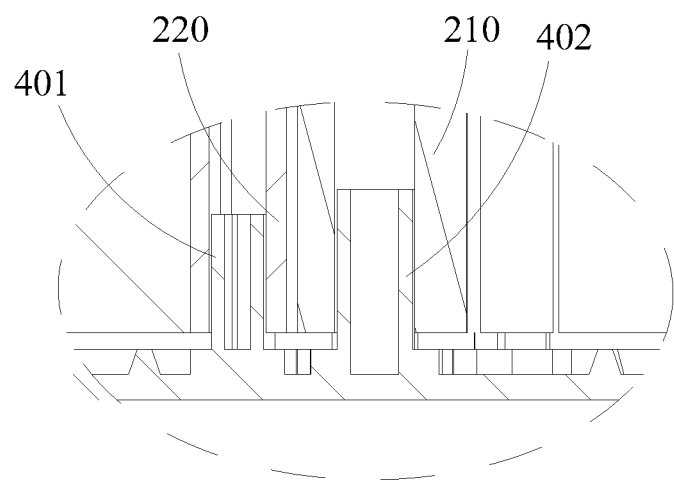
FIG. 14 is an enlargement view of Point F shown in FIG. 12.

In order to facilitate the installation of the second end cover 400, please referring to FIG. 14. in the present embodiment, the inner side of the second end cover 400 is protruded with a plurality of first positioning protrusions 401 associated with the positions and quantitys of the wastewater tubes 220, and the first positioning protrusions 401 extend into the corresponding wastewater tubes 220. The inner side of the second end cover 400 is protruded with a second positioning protrusion 402 associated with the position of the permeate tube 210, and the second positioning protrusion 402 extends into the permeate tube 210. The alignment of the second end cover 400 can be simplified through the cooperation of the first positioning protrusion 401 with the wastewater tube 220 and the second positioning protrusion 402 with the permeate tube 210. In the meanwhile, the central tube set 200 and the second end cover 400 are connected through the first positioning protrusion 401 and the second positioning protrusion 402, which can further improve the structural compactness and reliability of the whole spiral-wound reverse osmosis membrane component 700.

When necessary, the second end cover 400 can also be designed with a water outlet analogue to the first end cover 301, thus forming a permeate flow path or/and a wastewater pathway at the second end cover 400. Please further refer to FIG. 12. In the present embodiment, in order to simplify the waterway, the second end cover 400 is not provided with a water outlet. When the second end cover 400 is sealed and fit with the central tube set 200, the permeate in the permeate tube 210 and the wastewater in the wastewater tube 220 will not flow toward the second end cover 400 to be discharged. However, when the sealing effect between the second end cover 400 and the center tube 200 is not well performed, the permeate and wastewater may flow toward the second end cover 400 to be discharged into the housing of the filter cartridge, thus affecting the purification efficiency. In order to avoid this situation, in the present embodiment, an end of the permeate tube 210 remote from the first end cover 301 is plugged so that permeate flows to the pure water outlet 320 of the first end cover 301. An end of the wastewater tube 220 remote from the first end cover 301 is plugged to allow wastewater to flow to the first end cover 301. Referring to FIG. 12, as such, the flow direction of permeate is fixed, which can reliably collect permeate. The flow direction of wastewater is fixed after plugging, and wastewater can be reliably collected. In actual application, the spiral-wound reverse osmosis membrane component 700 is generally placed vertically. As such, the corresponding permeate tube 210 and a plurality of wastewater tubes 220 are also placed vertically, with the first end cover 301 positioned at top and the second end cover 400 at bottom. The lower end of the permeate tube 210 is plugged, and the lower ends of the plurality of wastewater tubes 220 are plugged. Permeate and wastewater are collected from the upper end. The water flow is even, enabling a convenient tube line design.

Figure 16:
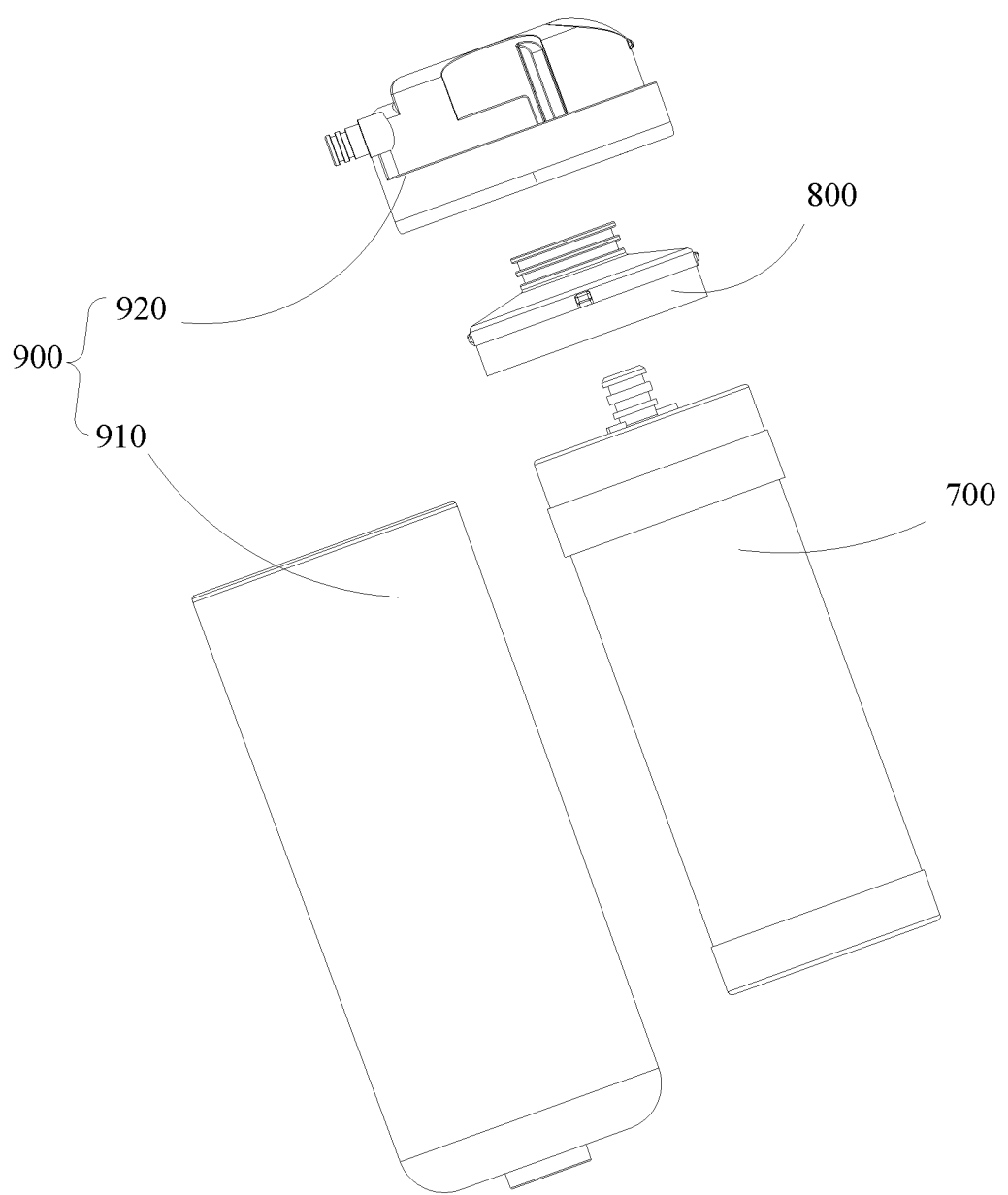
FIG. 16 is an exploded structural diagram of a filter cartridge according to an embodiment of the present application.

Referring to FIG. 16, the application also proposes a filter cartridge, which includes a housing 900, a waterway converter 800 and a spiral wound reverse osmosis membrane component 700. The specific structure of the spiral wound reverse osmosis membrane component 700 refers to the aforementioned embodiments. Since the filter cartridge adopts embodiments of the present application. The spiral wound reverse osmosis membrane component 700 is housed in the housing 900. The waterway converter 800 is provided with two independent waterways, and one of the waterways is communicated with the wastewater outlet 310, and the other of the waterways is communicated with the pure water outlet 320. Permeate and wastewater flowing out of the end cover are discharged into different tube lines through the guide of the waterway converter 800. In present embodiment, the housing 900 includes a receiving portion 910 and a filter cartridge head 920 covered on the receiving portion 910. The second end cover 400 of the spiral wound reverse osmosis membrane component 700 extends inward into the receiving portion 910. The waterway converter 800 is mounted between the first end cover 300 and the filter cartridge head 920.

The application also provides a reverse osmosis water purifier, which comprises a spiral-wound reverse osmosis membrane component and a filter cartridge. The specific structures of the spiral-wound reverse osmosis membrane component and the filter cartridge refer to the aforementioned embodiments.

Figure 17:
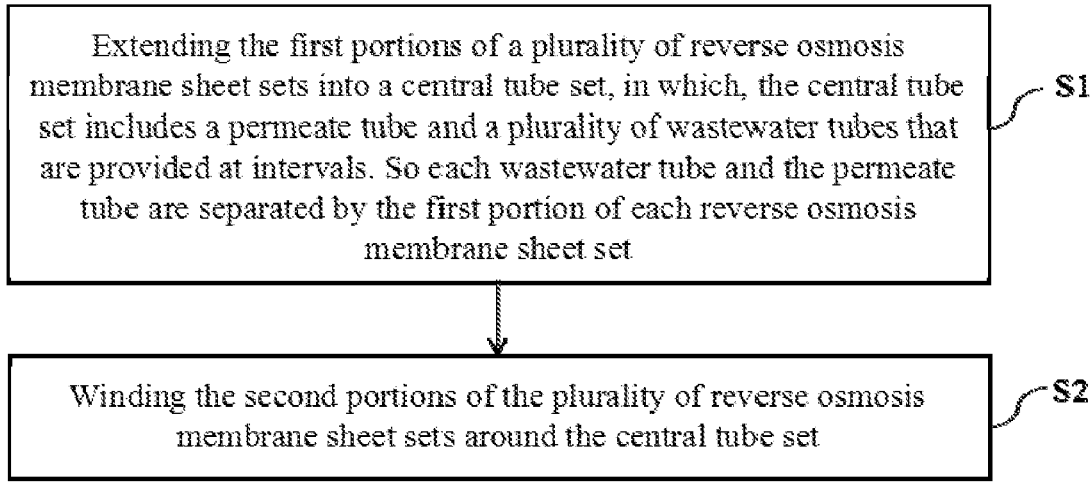
FIG. 17 is a flow chart of an embodiment of a winding method for a spiral wound reverse osmosis membrane component of the present application.

Referring to FIG. 17, the application also provides a membrane winding method for the aforementioned spiral wound reverse osmosis membrane component 700, which includes the following steps:

Step S1, extending the first portions of a plurality of reverse osmosis membrane sheet sets 100 into a central tube set 200, so each wastewater tube 220 and the permeate tube 210 are separated by the first portion of each reverse osmosis membrane sheet set 100. By extending the first portion of each sheet of reverse osmosis membrane sheet set 100 between the permeate tube 210 and the wastewater tube 220 in the central tube set 200 and by distinction of the front surface and back surface of the reverse osmosis membrane sheet, the back surface of the reverse osmosis membrane sheet 110 for producing permeate is adjacent to the permeate tube 210, while the front side of the reverse osmosis membrane sheet 110 for producing wastewater is connected to the wastewater tube 220, thus realizing separation of permeate and feed water.

Step S2, winding the second portions of the plurality of reverse osmosis membrane sheet sets 100 around the central tube set 200. The second portion of the multi-sheet reverse osmosis membrane sheet set 100 is wound around the central tube set 200 by winding, bending back and forth, etc. A plurality of flow channels are formed from the periphery of the central tube set 200 to provide flow channels for the feed water and permeate. Of course, attention should be paid to the separation of the influx channel and water producing channel during the winding arrangement.

When winding the membrane sheet, operations of the aforementioned steps can be followed, and the operations in conformity with the aforementioned operations can be applied to the membrane winding method of the present application.

Taking the spiral wound reverse osmosis membrane component shown in an embodiment as an example, the operation of each step of this membrane winding method will be described in detail, with the front of the permeate tube 210 as the operator's operation station.

Figure 18:
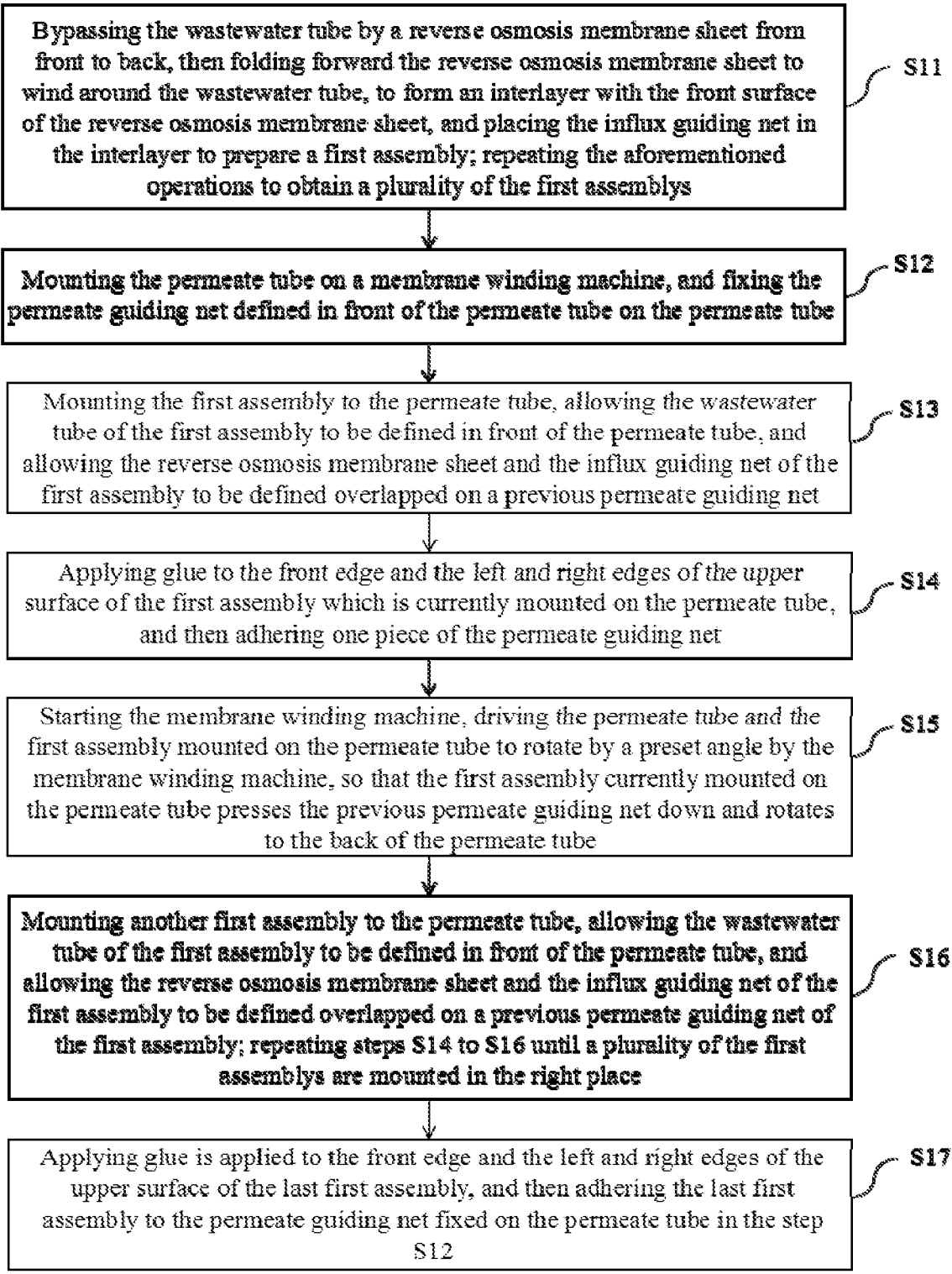
FIG. 18 is a detailed schematic flow chart of step S1 of the winding method of the spiral wound reverse osmosis membrane component shown in FIG. 17.

In which, referring to FIG. 18 with combination of FIGS. 1 to 3, the step S1 includes:

S11, bypassing the wastewater tube by a reverse osmosis membrane sheet 110 from front to back, then folding forward the reverse osmosis membrane sheet 110 to wind around the wastewater tube 220, to form an interlayer with the front surface of the reverse osmosis membrane sheet 110, and placing the influx guiding net 120 in the interlayer to prepare a first assembly 300; repeating the aforementioned operations to obtain a plurality of the first assemblies 300.

Figure 19:
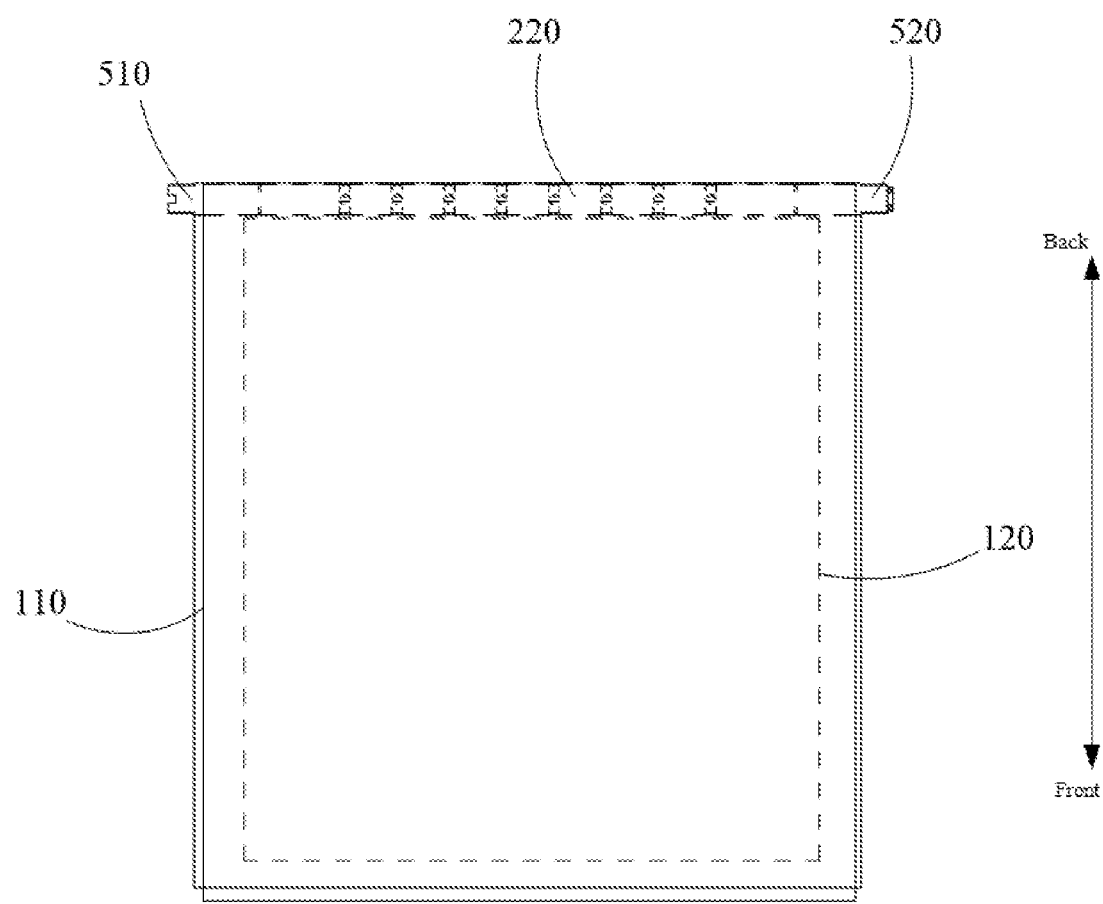
FIG. 19 is a schematic structural view of a first assembly produced in the winding method of the spiral wound reverse osmosis membrane component shown in FIG. 18.

Referring to FIG. 19, a reverse osmosis membrane sheet 110 of each reverse osmosis membrane sheet set 100 is arranged being folded inward on the front surface, so that an independent influx channel is formed between the front surface of one same reverse osmosis membrane sheet 110. The influx guiding net 120 and the wastewater tube 220 are positioned in the influx channel, and the wastewater tube 220 is positioned at the rear end of the first assembly 300. In order to facilitate the installation of the wastewater tube 220 during membrane winding, it is also necessary to correspondingly arrange installation structures at both ends of the wastewater tube 220, and to arrange corresponding fitting structures on the connection mechanism of the permeate tube 210, so that the wastewater tube 220 can be fixedly mounted on the permeate tube 210. In the meanwhile, during membrane winding, the width of the reverse osmosis membrane sheet 110 should be larger than the length of the wastewater tube 220, enabling subsequent operations of gluing and cutting.

S12, mounting the permeate tube 210 on a membrane winding machine, and fixing the pure water guiding net 130 defined in front of the permeate tube 210 on the permeate tube 210.

In order to install the permeate tube 210 on the membrane winding machine, it is necessary to provide a connection mechanisms to connect to the rotating shaft of the membrane winding machine at both ends of the permeate tube 210. The pure water guiding net 130 in this step may be fixed to one surface of the permeate tube 210 without the first avoiding opening 214 by ultrasonic welding or adhesion. In subsequent operation, the membrane winding machine can drive the permeate tube 210 and the component mounted on the permeate tube 210 to rotate after starting the membrane winding machine.

In this step, the membrane winding machine can also be started to wind, so that the pure water guiding net 130 can wind around the permeate tube 210 for one round, so that the pure water guiding net 130 can be positioned more reliably.

S13, mounting the first assembly 300 to the permeate tube 210, allowing the wastewater tube 220 of the first assembly 300 to be defined in front of the permeate tube 210, and allowing the reverse osmosis membrane sheet 110 and the influx guiding net 120 of the first assembly 300 to be defined overlapped on a previous pure water guiding net 130.

The pure water guiding net 130 in the previous step may refer to the pure water guiding net 130 fixed in the previous step.

Figure 20:
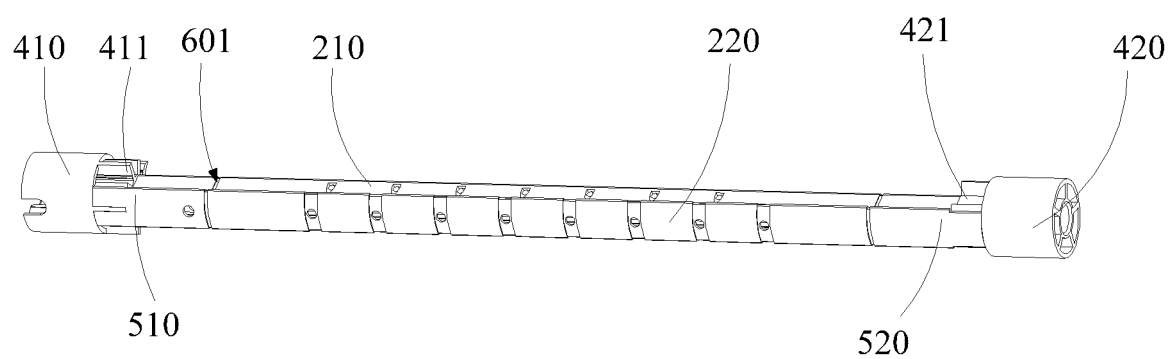
FIG. 20 is a schematic structural diagram of coordinate installation of the permeate tube and the wastewater tube in the winding method of the spiral wound reverse osmosis membrane component shown in FIG. 18.
Figure 21:
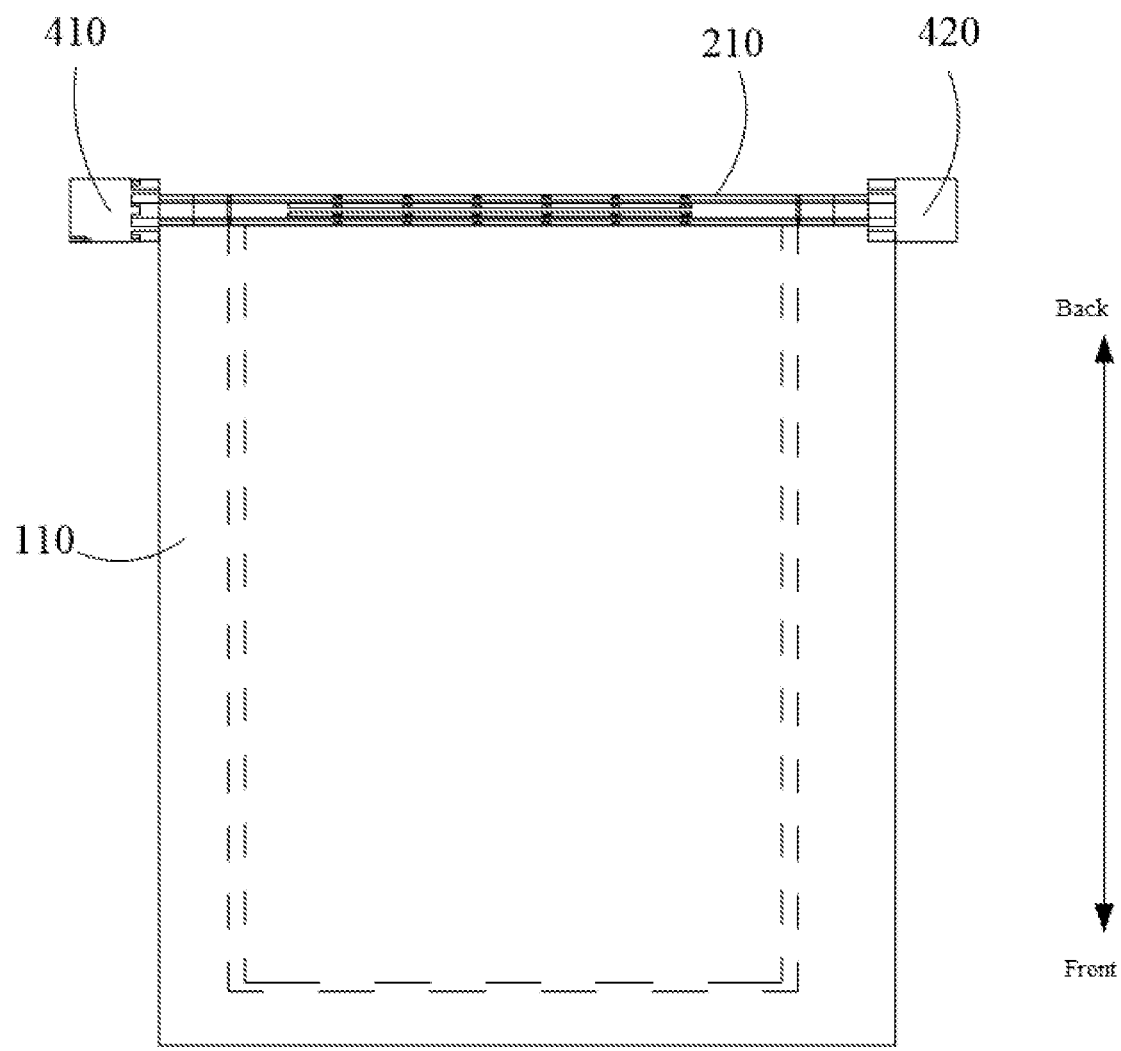
FIG. 21 is a state structural diagram of step S14 in the winding method of the spiral wound reverse osmosis membrane component shown in FIG. 18.

Referring to FIGS. 19 to 21, the connection mechanism includes a first connection portion 410 and a second connection portion 420 arranged at both ends of the permeate tube 210. The first connection portion 410 is provided with an fool-proofing fitting portion 411, and the second connection portion 420 is provided with a fixed fitting portion 421. The installation structure includes fool-proofing fitting portions 510 and fixed mounting portions 520 disposed at both ends of the wastewater tube 220, respectively. The fool-proofing mounting portions 510 are fitted with the fool-proofing fitting portions 411 to prevent the wastewater tube 220 from being mounted inversely. The fixed fitting portions 421 and the fixed fitting portions 520 are fitted for installation of the wastewater tube 220. In which, the fool-proofing fitting portion 411 and the fixed fitting portion 421 may be grooves with different shapes, while the fool-proofing fitting portion 510 and the fixing mounting portion 520 may be corresponding protrusions, which are mounted by inserting and interference fitting.

S14, applying glue to the front edge and the left and right edges of the upper surface of the first assembly 300 which is currently mounted on the permeate tube 210, and then adhering one piece of the pure water guiding net 130.

Please refer to FIG. 21, in which the dotted line indicates where the glue is applied. The glue applied in this step can be polyurethane glue. Since the pure water guiding net 130 is provided with holes, the glue can penetrate the pure water guiding net 130 to adhere the reverse osmosis membrane 110 on the other side of the pure water guiding net 130 during the subsequent membrane winding operation. The glue should be applied to the adjacent position of the wastewater tube 220, the corresponding fool-proofing mounting portion 510 and the fixed mounting portion 520, as well as the adjacent positions of the permeate tube 210, the first connecting portion 410 and the second connecting portion 420. A cutting groove 601 can be defined at this position. When cutting and separating the first connecting portion 410, the second connecting portion 420, the fool-proofing mounting portion 510 and the fixed mounting portion 520 along the cutting groove 601 after membrane winding is completed, the sealing of the corresponding permeate channel will not be influenced. The rear end of the adhered pure water guiding net 130 needs to be tightly attached to the permeate tube 210, so that permeate can be better directed to the permeate tube 210.

S15, starting the membrane winding machine, driving the permeate tube 210 and the first assembly 300 mounted on the permeate tube to rotate by a preset angle by the membrane winding machine, so that the first assembly 300 currently mounted on the permeate tube 210 presses the previous pure water guiding net 130 down and rotates to the back of the permeate tube 210.

The rotation in this step is to move the mounted first assembly 300 out of the operation station so that the next first assembly 300 can be mounted in the operation station. The preset angle of movement is set according to the quantity of wastewater tubes 220 (associated with the quantity of first assemblies 300). When the quantity of wastewater tubes 220 is M (M is greater than or equal to 2), the preset angle is 360/M degrees. After turning the aforementioned angle, the mounted first assembly 300 can be just moved out and the installation position of the next first assembly 300 can be moved to the operation station. When observing from the right side, the rotation direction of this step is counterclockwise. As such, the currently mounted first assembly 300 can press the lower pure water guiding net 130 to position the lower reverse osmosis membrane 110 or flow guiding net, so as to prevent the mounted components from moving and influencing subsequent operations.

S16, mounting the first assembly 300 to the permeate tube 210, allowing the wastewater tube 220 of the first assembly 300 to be defined in front of the permeate tube 210, and allowing the reverse osmosis membrane sheet 110 and the influx guiding net 120 of the first assembly 300 to be defined overlapped on a previous pure water guiding net 130.

The back surface of the reverse osmosis membrane 110 of the first assembly 300 mounted in this step and the back surface of the reverse osmosis membrane 110 of the adjacent first assembly 300 together form a water producing channel, Under the adhesion of the glue, lateral sides of the water producing channel is enabled to be closed and sealed, except for a side close to the permeate tube 210, allowing the water producing channel to have a pure water outlet toward the permeate tube 210. As such, the water producing channel forms a membrane bag with three sides sealed and one side open, and opening of the membrane bag faces the permeate tube 210, which limits the permeate in the membrane bag to flow only towards the permeate tube 210. The feed water generates permeate after the reverse osmosis membrane 110, and the permeate is formed in the membrane bag and flows to the opening of membrane bag into the permeate tube 210.

repeating steps S14 to S16 until a plurality of the first assembly 300 are mounted in the right place, and proceed to step S17;

S17, applying glue is applied to the front edge and the left and right edges of the upper surface of the last first assembly 300, and then adhering the last first assembly 300 to the pure water guiding net 130 fixed on the permeate tube 210 in the step S12.

At this time, all wastewater tubes 220 are mounted in place, and the corresponding reverse osmosis membrane sheet set 100 is also mounted in place. The isolation of the wastewater tube 220 from the permeate tube 210 is realized. The water producing channel and the influx channel are defined to provide a basis for subsequent winding operations.

The step S2 includes:

S21, starting the membrane winding machine to drive the permeate tube 210 and the first assembly 300 mounted on the permeate tube to rotate according to the rotation direction in the step S15, until the second portions of the plurality of reverse osmosis membrane sheet sets 100 being all wound around the central tube set 200, after laminating the second portions of the plurality of reverse osmosis membrane sheet sets 100.

According to the rotation direction in step S15 (when observing from the right, the rotation direction in this step is counterclockwise), the multi-sheet reverse osmosis membrane sheet set 100 can be overlapped in sequence, and finally a plurality of smooth spiral flow paths can be formed. Compared with irregular water pathways, feed water and permeate flow more evenly, thus obtaining better water purification.

What is claimed is:

1. A central tube set, applied to a spiral wound reverse osmosis membrane component, wherein the central tube set comprises:
    A permeate tube, a peripheral wall of the permeate tube being defined with a pure water influx hole communicating with an internal channel of the permeate tube; and
    A plurality of wastewater tubes defined at intervals, the wastewater tubes being defined around the permeate tube, a peripheral wall of each wastewater tube being defined with a wastewater influx hole communicating with an internal channel of each wastewater tube;
    The plurality of the wastewater tubes and the permeate tube are defined at intervals, to form a receiving space between each wastewater tube and the permeate tube, for receiving a portion of a reverse osmosis membrane sheet set which is extending into the central tube set, wherein, a quantity of the wastewater tubes is N, and N is greater than or equal to 3;
    A cross section of the permeate tube is configured as N-polygonal and correspondingly has N lateral surfaces, each lateral surface is defined with the pure water influx hole; each wastewater tube is defined at a position corresponding to one of the lateral surfaces; or
    A quantity of the wastewater tubes is two; the permeate tube is a flat tube, and the permeate tube has two lateral surfaces, and each of the lateral surfaces is defined with the pure water influx hole; each of the wastewater tubes is defined at a position corresponding to one of the lateral surfaces.

2. The central tube set of claim 1, wherein, a plurality of pure water influx holes are defined on each lateral surface at intervals, and the plurality of pure water influx holes are defined along a length direction of the permeate tube; and/or, each wastewater tube is defined with a plurality of wastewater influx holes at intervals, and the plurality of wastewater influx holes are defined along a length direction of each of the wastewater tube.

3. The central tube set of claim 1, wherein, a cross section of the permeate tube is circular, a peripheral wall of the permeate tube is divided into a plurality of arc surface sections corresponding to the plurality of wastewater tubes along a peripheral direction of the permeate tube, and each arc surface section is defined with the pure water influx hole; each wastewater tube is defined at a position corresponding to one of the arc surface sections.

4. The central tube set of claim 3, wherein, a plurality of pure water influx holes are defined at intervals on each arc surface section, and the plurality of pure water influx holes are defined along a length direction of the permeate tube; and/or,
    each wastewater tube is defined with a plurality of wastewater influx holes at intervals, and the plurality of wastewater influx holes are defined along a length direction of the wastewater tube.

5. The central tube set of claim 1, wherein, the peripheral wall of the permeate tube is defined with a first avoiding opening extending along a length direction of the permeate tube.

6. The central tube set of claim 5, wherein a first strengthening rib is defined in the first avoiding opening, and two ends of the first strengthening rib are respectively connected with different two edges of the first avoiding opening.

7. The central tube set of claim 5, wherein, the peripheral wall of each wastewater tube is defined with a second avoiding opening extending along a length direction of the wastewater tube.

8. The central tube set of claim 7, wherein, a second strengthening rib is defined in the second avoiding opening, and two ends of the second strengthening rib are respectively connected with different two edges of the second avoiding opening.

9. The central tube set of claim 1, wherein, one end of the permeate tube is plugged, to allow pure water to flow to the other end of the permeate tube; and/or,
    one end of at least one of the wastewater tubes is plugged, to allow wastewater to flow to the other end of the at least one of wastewater tubes.

10. The central tube set of claim 9, wherein one end of the permeate tube is plugged and one end of each wastewater tube is plugged; the plugged end of the permeate tube and the plugged end of each wastewater tube are located on a same side.

11. A spiral wound reverse osmosis membrane component, comprising:
    A central tube set and a plurality of reverse osmosis membrane sheet sets, each of the reverse osmosis membrane sheet sets having a first portion positioned inside the central tube set and a second portion positioned outside the central tube set,
    Wherein, the central tube set comprises:
        A permeate tube, a peripheral wall of the permeate tube being defined with a pure water influx hole communicating with an internal channel of the permeate tube; and
        A plurality of wastewater tubes defined at intervals, the wastewater tubes being defined around the permeate tube, a peripheral wall of each wastewater tube being defined with a wastewater influx hole communicating with an internal channel of each wastewater tube;
        The plurality of the wastewater tubes and the permeate tube being defined at intervals, to form a receiving space between each wastewater tube and the permeate tube, for receiving a portion of the reverse osmosis membrane sheet set which is extending into the central tube set;
        Each wastewater tube and the permeate tube being separated by the first portion of one of the reverse osmosis membrane sheet sets; the second portion of the plurality of the reverse osmosis membrane sheet sets forming a plural membrane assembly around the central tube set, wherein, the central tube set comprises the plurality of wastewater tubes,
        A quantity of the wastewater tubes is N, and N is greater than or equal to 3;

A cross section of the permeate tube is configured as N-polygonal and correspondingly has N lateral surfaces, each lateral surface is defined with the pure water influx hole; each wastewater tube is defined at a position corresponding to one of the lateral surfaces; or A quantity of the wastewater tubes is two; the permeate tube is a flat tube, and the permeate tube has two lateral surfaces, and each of the lateral surfaces is defined with the pure water influx hole; each of the wastewater tubes is defined at a position corresponding to one of the lateral surfaces.

12. The spiral wound reverse osmosis membrane component of claim 11, wherein, each reverse osmosis membrane sheet set comprises a reverse osmosis membrane sheet, an influx guiding net, and a pure water guiding net, wherein the influx guiding net and the pure water guiding net are respectively defined on front and back surfaces of the reverse osmosis membrane sheet;

wherein, the influx guiding net of each reverse osmosis membrane sheet set dose not contact with the permeate tube and the back surface of reverse osmosis membrane sheet of the other reverse osmosis membrane sheet sets;

the pure water guiding net of each reverse osmosis membrane sheet set does not contact with the wastewater tube and the front surface of reverse osmosis membrane sheet of the other reverse osmosis membrane sheet sets.

13. The spiral wound reverse osmosis membrane component of claim 11, wherein, the spiral wound reverse osmosis membrane component further comprises a first end cover and a second end cover, wherein the first end cover and the second end cover are respectively sleeved at two ends of the central tube set and the plurality of reverse osmosis membrane sheet sets, to position the central tube set and the reverse osmosis membrane sheet set;

wherein, the first end cover is defined with a wastewater outlet and a pure water outlet; or, the first end cover is defined with a wastewater outlet, and the second end cover is defined with a pure water outlet; the wastewater tube is communicated with the wastewater outlet and the permeate tube is communicated with the pure water outlet.

14. The spiral wound reverse osmosis membrane component of claim 13, wherein, an inner side of the first end cover is protruded with a plurality of first extending tubes which are communicated with the wastewater outlet and are associated with a position and a quantity of the wastewater tubes, and the first extending tubes extend into the wastewater tubes and are communicated between the wastewater outlet and the associated wastewater tubes;

an inner side of the first end cover is protruded with a second extending tube which is communicated with the pure water outlet and is associated with a position of the permeate tube, and the second extending tube extends into the permeate tube and communicates with the pure water outlet and the permeate tube.

15. The spiral wound reverse osmosis membrane component of claim 13, wherein, an inner side of the second end cover is protruded with a plurality of first positioning protrusions associated with a position and a quantity of the wastewater tubes, and the first positioning protrusions are configured to extend into the wastewater tubes associated with the first positioning protrusions;

an inner side of the second end cover is protruded with a second positioning protrusion associated with a position of the permeate tube, and the second positioning protrusion is configured to extend into the permeate tube.

16. The spiral wound reverse osmosis membrane component of claim 11, wherein, each reverse osmosis membrane sheet of the reverse osmosis membrane sheet set is configured to be folded inward on a front surface, and the second portions of the plurality of reverse osmosis membrane sheet sets are overlapped and jointly wound around the central tube set in a peripheral direction; an influx channel is formed between front surfaces of one same reverse osmosis membrane sheet; a water producing channel is formed between back surfaces of two adjacent reverse osmosis membrane sheets; the influx guiding net and the wastewater tube are positioned in the influx channel, and the pure water guiding net is positioned in the water producing channel.

17. The spiral wound reverse osmosis membrane component of claim 16, wherein, lateral sides of the water producing channel are closed and plugged, except for the side of the water producing channel close to the permeate tube, allowing the water producing channel to have a pure water outlet toward the permeate tube.

18. A reverse osmosis water purifier, comprising:

A spiral wound reverse osmosis membrane component; the spiral wound reverse osmosis membrane component comprising a central tube set and a plurality of reverse osmosis membrane sheet sets, each reverse osmosis membrane sheet set having a first portion positioned inside the central tube set and a second portion positioned outside the central tube set, Wherein, the central tube set comprises:

A permeate tube, a peripheral wall of the permeate tube being defined with a pure water influx hole communicating with an internal channel of the permeate tube; and A plurality of wastewater tubes defined at intervals, the wastewater tubes being defined around the permeate tube, a peripheral wall of each wastewater tube being defined with a wastewater influx hole communicating with an internal channel of each wastewater tube;

The plurality of the wastewater tubes and the permeate tube are defined at intervals, to form a receiving space between each wastewater tube and the permeate tube, for receiving a portion of the reverse osmosis membrane sheet set which is extending into the central tube set, each wastewater tube and the permeate tube being separated by the first portion of one of the reverse osmosis membrane sheet sets; the second portion of the plurality of the reverse osmosis membrane sheet set forming a plural membrane assembly surrounding the central tube set, wherein, a quantity of the wastewater tubes is N, and N is greater than or equal to 3;

A cross section of the permeate tube is configured as N-polygonal and correspondingly has N lateral surfaces, each lateral surface is defined with the pure water influx hole; each wastewater tube is defined at a position corresponding to one of the lateral surfaces; or A quantity of the wastewater tubes is two; the permeate tube is a flat tube, and the permeate tube has two lateral surfaces, and each of the lateral surfaces is defined with the pure water influx hole; each of the wastewater tubes is defined at a position corresponding to one of the lateral surfaces.

* * * * *